US011876435B2

United States Patent
Ayai

(10) Patent No.: US 11,876,435 B2
(45) Date of Patent: Jan. 16, 2024

(54) DC/DC CONVERSION SYSTEM, ELECTRICITY STORAGE SYSTEM, AND METHOD FOR CONTROLLING DC/DC CONVERTER

(71) Applicant: SUMITOMO ELECTRIC INDUSTRIES, LTD., Osaka (JP)

(72) Inventor: Naoki Ayai, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/763,966

(22) PCT Filed: Sep. 9, 2020

(86) PCT No.: PCT/JP2020/034192
§ 371 (c)(1),
(2) Date: Mar. 25, 2022

(87) PCT Pub. No.: WO2021/106315
PCT Pub. Date: Jun. 3, 2021

(65) Prior Publication Data
US 2022/0320992 A1    Oct. 6, 2022

(30) Foreign Application Priority Data

Nov. 26, 2019  (JP) ................. 2019-213013

(51) Int. Cl.
H02M 1/00 (2006.01)
H02J 3/38 (2006.01)
H02J 7/00 (2006.01)

(52) U.S. Cl.
CPC .......... *H02M 1/0025* (2021.05); *H02J 3/381* (2013.01); *H02J 7/0048* (2020.01); *H02M 1/0006* (2021.05); *H02J 2300/24* (2020.01)

(58) Field of Classification Search
CPC .. H02M 1/0025; H02M 1/0006; H02M 1/007; H02M 3/158; H02M 7/53871;
(Continued)

(56) References Cited

U.S. PATENT DOCUMENTS

2011/0148205 A1 * 6/2011 Moon ............... H02J 9/062
307/65
2014/0340941 A1 * 11/2014 Jutras ............... H02M 3/285
363/21.01
(Continued)

FOREIGN PATENT DOCUMENTS

CN    110365004    * 10/2019
CN    110365004 A    10/2019
(Continued)

OTHER PUBLICATIONS

Caponio F. et al., "Modular and Bi-Directional Energy Storage System Compliant with Accumulators of Different Chemistry," Electrical Power Quality and Utilisation (EPQU), 2011 11th International Conference on IEEE, pp. 1-6; Oct. 17, 2011.

*Primary Examiner* — Rexford N Barnie
*Assistant Examiner* — Swarna N Chowdhuri
(74) *Attorney, Agent, or Firm* — Oliff PLC

(57) ABSTRACT

This DC/DC conversion system is provided between a plurality of DC power supplies and a common DC bus, and includes, for each of the plurality of DC power supplies: a DC/DC converter provided between the DC power supply and the DC bus; and a control unit configured to control the DC/DC converter. The control unit corrects a voltage detection value for the DC bus by taking in an individual voltage detection deviation for the DC bus compared to an entirety of a plurality of the DC/DC converters present in parallel, and controls the corresponding DC/DC converter in accordance with a voltage command value having droop characteristics with respect to output power. The DC/DC conver-
(Continued)

sion system as described above can uniform outputs while operating the plurality of DC/DC converters in parallel without the need of fast communication.

9 Claims, 19 Drawing Sheets

(58) Field of Classification Search
CPC ...... H02M 3/155; H02M 7/5387; H02J 3/381; H02J 7/0048; H02J 2300/24; H02J 7/0013; H02J 1/102
USPC .......................................................... 307/82
See application file for complete search history.

(56) References Cited

U.S. PATENT DOCUMENTS

| | | | |
|---|---|---|---|
| 2015/0092462 A1* | 4/2015 | Ohori | ........................ H02J 3/48 363/71 |
| 2016/0013670 A1 | 1/2016 | Tohara et al. | |
| 2017/0054303 A1* | 2/2017 | Choi | .................. H02J 7/007182 |
| 2017/0077819 A1 | 3/2017 | Andres | |

FOREIGN PATENT DOCUMENTS

| | | |
|---|---|---|
| EP | 3 089 310 A1 | 11/2016 |
| JP | 2010-011567 A | 1/2010 |
| JP | 2014-171335 A | 9/2014 |
| JP | 2015-027225 A | 2/2015 |
| JP | 2015-122885 A | 7/2015 |

* cited by examiner

FIG. 2
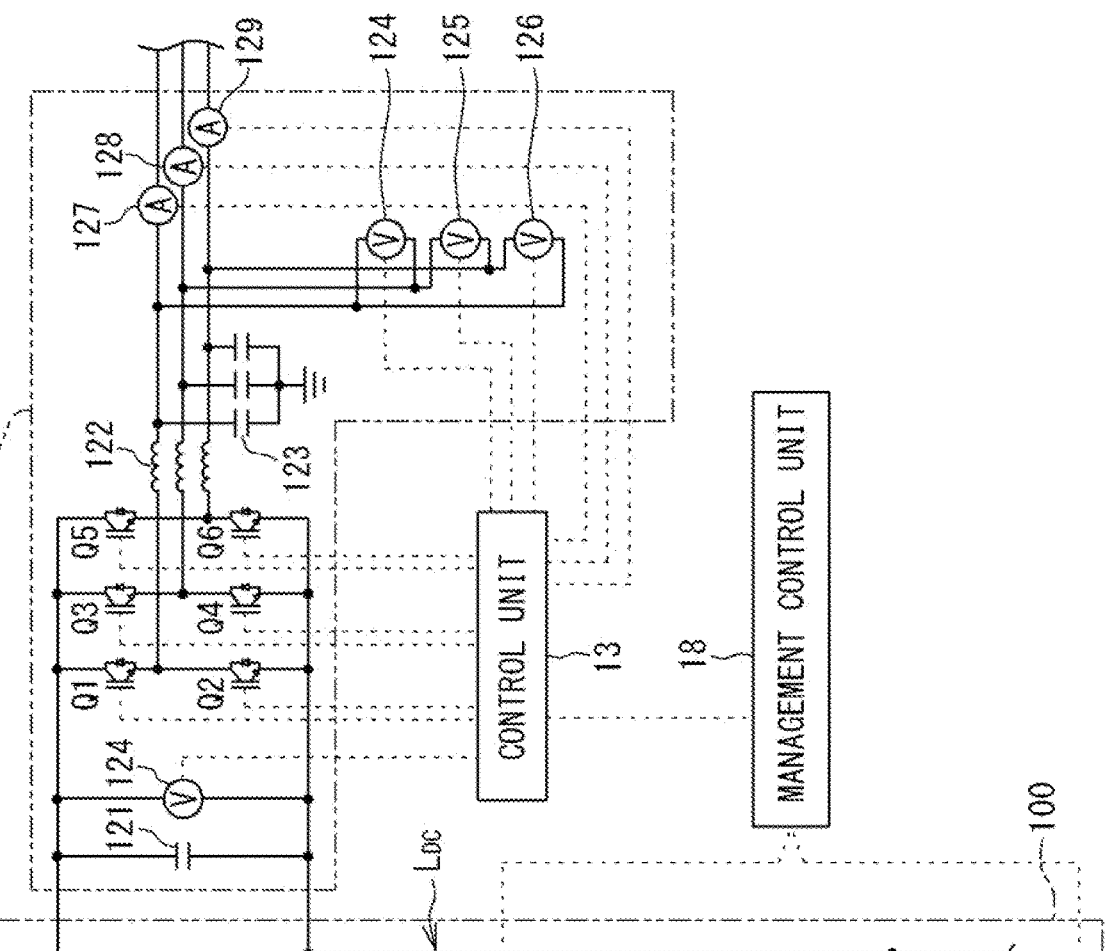
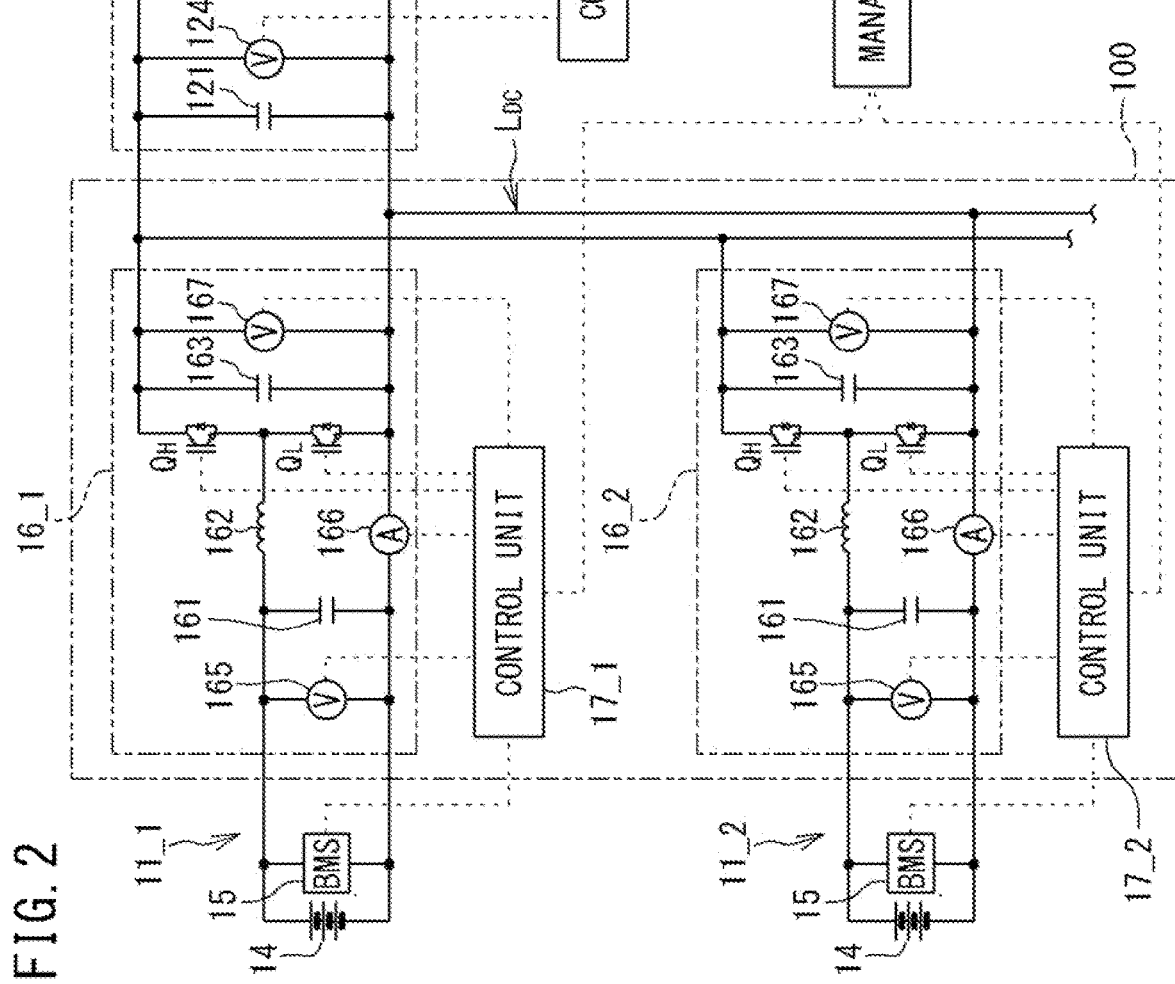

DC/DC CONVERSION SYSTEM, ELECTRICITY STORAGE SYSTEM, AND METHOD FOR CONTROLLING DC/DC CONVERTER

TECHNICAL FIELD

The present disclosure relates to a DC/DC conversion system, a energy storage system, and a method for controlling DC/DC converters.

This application claims priority on Japanese Patent Application No. 2019-213013 filed on Nov. 26, 2019, the entire content of which is incorporated herein by reference.

BACKGROUND ART

A large-capacity (e.g., several-megawatt class) energy storage system including multiple cells having a high energy density such as a lithium ion battery has been proposed (see, for example, Patent Literature 1). Since the voltage of one cell is about 4 V, it is necessary to form a cell string having an increased voltage by connecting multiple cells in series. In order to obtain a large capacity, it is necessary to further connect multiple such cell strings in parallel. The cell strings connected in parallel become different from each other in the state of charge (SOC), due to charging and discharging. Therefore, in order to adjust allocation of power among the parallel cell strings, a configuration of connecting them to a common bus via power conversion devices is adopted.

Also proposed is a configuration in which different types of distributed power supplies such as a photovoltaic panel, a storage battery, and a fuel cell are connected to a common DC bus via respective power conversion devices (see, for example, Patent Literature 2).

CITATION LIST

Patent Literature

PATENT LITERATURE 1: Japanese Laid-Open Patent Publication No. 2014-171335
PATENT LITERATURE 2: Japanese Laid-Open Patent Publication No. 2015-122885

SUMMARY OF THE INVENTION

The present disclosure includes the following invention. However, the present invention is defined by the claims.

A DC/DC conversion system according to the present disclosure is a DC/DC conversion system provided between a plurality of DC power supplies and a common DC bus, the DC/DC conversion system including, for each of the plurality of DC power supplies: a DC/DC converter provided between the DC power supply and the DC bus; and a control unit configured to control the DC/DC converter. The control unit corrects a voltage detection value for the DC bus by taking in an individual voltage detection deviation for the DC bus compared to an entirety of a plurality of the DC/DC converters present in parallel, and controls the corresponding DC/DC converter in accordance with a voltage command value having droop characteristics with respect to output power.

A energy storage system according to the present disclosure is a energy storage system having a plurality of DC power supplies and connected to a common DC bus, the energy storage system including, for each of the plurality of DC power supplies: a DC/DC converter provided between the DC power supply and the DC bus; and a control unit configured to control the DC/DC converter. The control unit corrects a voltage detection value for the DC bus by taking in an individual voltage detection deviation for the DC bus compared to an entirety of a plurality of the DC/DC converters present in parallel, and controls the corresponding DC/DC converter in accordance with a voltage command value having droop characteristics with respect to output power.

A method according to the present disclosure is a method for controlling a plurality of DC/DC converters provided in parallel to each other between a plurality of DC power supplies and a common DC bus, the method including: correcting a voltage detection value for the DC bus by taking in an individual voltage detection deviation for the DC bus compared to an entirety of the plurality of DC/DC converters; and controlling the corresponding DC/DC converter in accordance with a voltage command value having droop characteristics with respect to output power.

BRIEF DESCRIPTION OF DRAWINGS

FIG. 2 is a circuit diagram in which, as an example, two DC power supply devices are connected to a DC bus.

DETAILED DESCRIPTION

Figure 1:
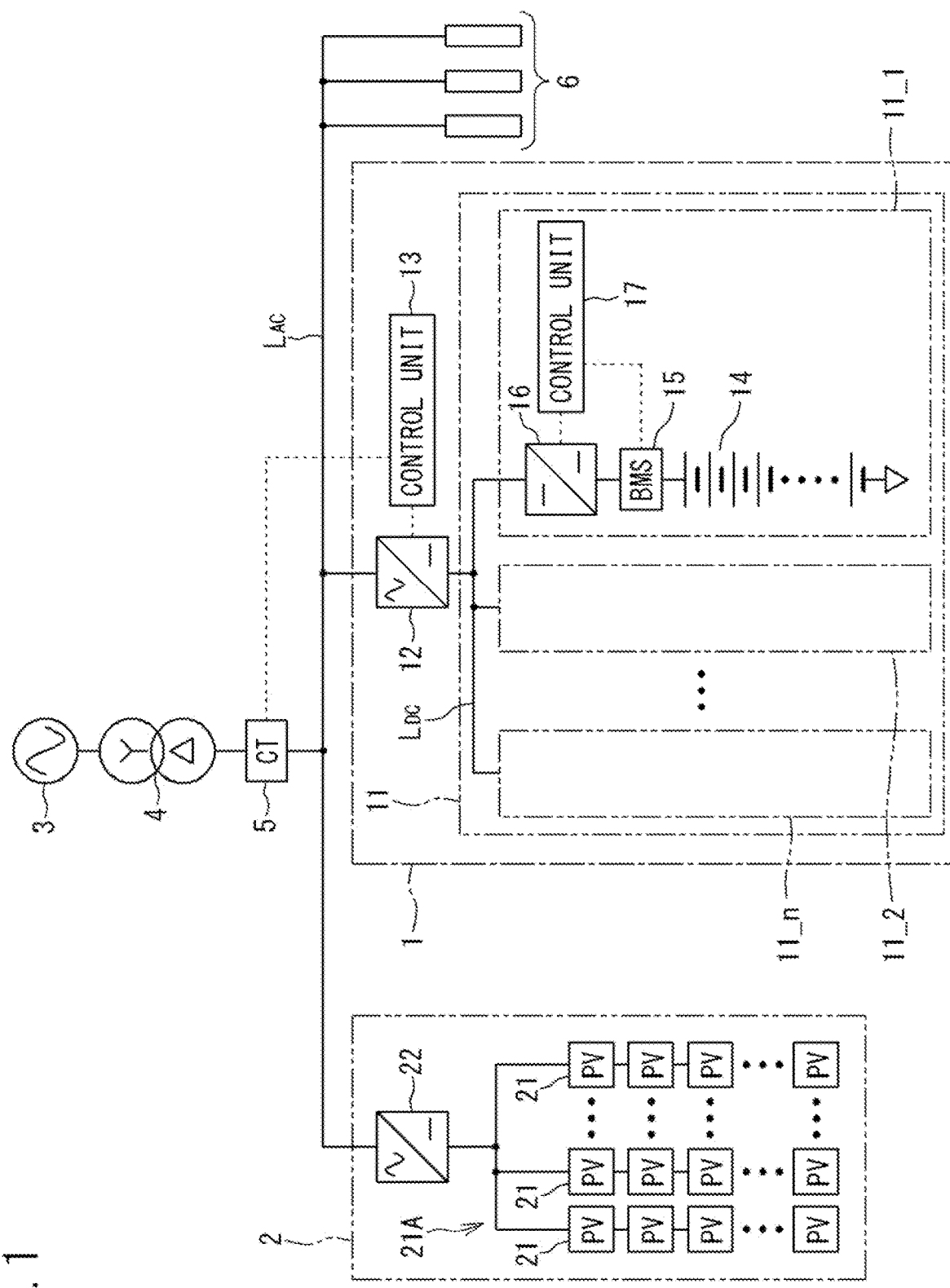
FIG. 1 is a single-line connection diagram of a power supply grid including a energy storage system.

Problems to be Solved by the Present Disclosure

In a energy storage system, in order to control each of currents of a plurality of cell strings connected in parallel to each other, it is necessary to interpose a DC/DC converter between a DC bus and each cell string. By using the DC/DC converter, voltage variation due to the SOC of the cell string is absorbed, whereby the DC bus voltage can be kept at an optimum value. By keeping the optimum value, power conversion loss in a DC/AC converter connected to the DC bus can be minimized.

A control unit for the DC/DC converter communicates with a battery management system (BMS) for monitoring the state of the cell string, and controls charging/discharging in accordance with the state of the cell string. In this communication, for example, a controller area network (CAN) or RS-485 is used.

In a case of a energy storage system which performs grid interconnection via a DC/AC converter from a DC bus, for example, each DC/DC converter performs charging/discharging in accordance with a power command value transmitted from a power control unit included in the energy storage system, and the DC/AC converter controls power so that the DC bus voltage is kept constant. The power control unit determines a power command value for charging/discharging of each DC/DC converter so that the total output of the DC/DC converters coincides with a power command value.

Thus, in such a conventional energy storage system, communication means for transmitting a power command value from a power control unit to each DC/DC converter is essential. For this communication, real-time performance for keeping control delay constant is required. In addition, it is required that command values can be transmitted from one power control unit to multiple DC/DC converters, and high reliability including resistance against noise due to switching is required. Therefore, for example, RS-485 communication via a bus network is used. The control cycle, which differs depending on requirements of the energy storage system, needs to be shorter than 0.5 second corresponding to an operation condition for a reverse power protection relay required by the grid-interconnection code, and in order to eliminate transient reverse power caused by load variation, control delay needs to be 100 milliseconds or shorter. Thus, a communication speed that meets such requirements is always required.

Meanwhile, in a energy storage system that performs stand-alone operation, a DC/AC converter performs AC voltage control and the output power is determined depending on a load. In this case, the DC bus voltage cannot be controlled to an optimum value by the DC/AC converter, and therefore, with a plurality of DC/DC converters, feedback control is performed so as to keep the DC bus voltage constant. A power control unit compares a DC bus voltage detection value and a target value, to determine a power command value for charging/discharging in the entirety, and transmits allocated power command values to control units for the respective DC/DC converters. In order to keep the variation width of the DC bus voltage within a predetermined range, delay time from voltage detection for the DC bus until control needs to be, for example, 1.2 milliseconds or shorter, i.e., about $\frac{1}{100}$ of delay time required in grid interconnection operation. If delay time becomes longer than this, capacitances of smoothing capacitors need to be increased so as to reduce the voltage variation width, leading to cost increase.

As described above, in such a large-capacity energy storage system using a lithium ion battery, multiple DC/DC converters are needed for connecting cell strings in parallel to a DC bus. Further, in order to transmit power command values for charging/discharging to the respective DC/DC converters from a power control unit, it is necessary to provide communication means with high reliability and short delay time. In particular, in stand-alone operation, control delay needs to be at least several milliseconds or shorter. However, as the capacity of the energy storage system increases and the number of parallel cell strings increases, the number of targets to which command values are transmitted from the power control unit increases, and thus it becomes difficult to keep control delay within several milliseconds. If it becomes possible to apply faster real-time communication owing to innovation in communication technology in the future, the above problem might be solved, but it is difficult to solve the problem at present.

Accordingly, an object of the present disclosure is to make it possible to uniform outputs while operating a plurality of DC/DC converters in parallel without the need of fast communication.

Effects of the Present Disclosure

According to the present disclosure, it becomes possible to uniform outputs among a plurality of DC/DC converters without the need of fast communication.

Description of Embodiments of the Present Disclosure

Embodiments of the present disclosure include at least the following as a gist.

(1) Disclosed is a DC/DC conversion system provided between a plurality of DC power supplies and a common DC bus, the DC/DC conversion system including, for each of the plurality of DC power supplies: a DC/DC converter provided between the DC power supply and the DC bus; and a control unit configured to control the DC/DC converter. The control unit corrects a voltage detection value for the DC bus by taking in an individual voltage detection deviation for the DC bus compared to an entirety of a plurality of the DC/DC converters present in parallel, and controls the corresponding DC/DC converter in accordance with a voltage command value having droop characteristics with respect to output power.

In the DC/DC conversion system as described above, such control that the plurality of DC/DC converters provided in parallel operate so as to be equal in their outputs is realized using the droop characteristics of the voltage command values with respect to the output powers. In addition, in order to inhibit the outputs of the plurality of DC/DC converters from becoming unequal due to error in voltage detection for the DC bus, the DC bus voltage detection values are corrected by taking in voltage detection deviations of the DC bus. Thus, it becomes possible to uniform the outputs among the plurality of DC/DC converters without depending on fast communication.

(2) The DC/DC conversion system of the above (1) may further include a management control unit configured to determine the voltage detection deviations corresponding to individual output deviations compared to the entirety of the plurality of DC/DC converters, and give correction values for reducing the voltage detection deviations to the respective control units for the plurality of DC/DC converters.

In this case, the management control unit can, as needed, determine voltage detection deviations with respect to the entirety of the plurality of DC/DC converters, and send correction values for reducing the voltage detection deviations to the respective control units. The control units can uniform the outputs of the plurality of DC/DC converters, using the sent correction values. Communication is used for this sending, but fast communication is not needed.

(3) In the DC/DC conversion system of the above (2), the management control unit may change the correction values in accordance with a number of the parallel DC/DC converters.

In this case, on the basis of a finding that appropriate correction values vary depending on the number of the parallel DC/DC converters, it is possible to give appropriate correction values in accordance with the number of the parallel DC/DC converters to the respective control units.

(4) In the DC/DC conversion system of the above (2) or (3), where the correction values are defined as first correction values, after each control unit has used the first correction value, the management control unit may newly determine voltage detection deviations corresponding to individual output deviations compared to the entirety of the plurality of DC/DC converters, and give second correction values for reducing the voltage detection deviations to the respective control units for the plurality of DC/DC converters.

In this case, even though the first correction values are provisional values, outputs of the plurality of DC/DC converters can be uniformed by the second correction values.

(5) In the DC/DC conversion system of the above (2) or (3), the management control unit may regularly update the correction values, and give the updated correction values to the respective control units for the plurality of DC/DC converters.

In this case, it is possible to provide appropriate correction values regularly even if the voltage detection deviations change over time.

(6) In the DC/DC conversion system of any one of the above (1) to (5), the DC power supply may be a storage battery, and the control unit may limit a current flowing through the DC power supply on the basis of a state of charge of the DC power supply.

In this case, the DC/DC converter corresponding to the storage battery that has reached a full-charge state or a discharge limit can be excluded from the targets for which the outputs are to be uniformed.

(7) Also disclosed is a energy storage system including a plurality of DC power supplies and a common DC bus, the energy storage system including, for each of the plurality of DC power supplies: a DC/DC converter provided between the DC power supply and the DC bus; and a control unit configured to control the DC/DC converter. The control unit corrects a voltage detection value for the DC bus by taking in an individual voltage detection deviation for the DC bus compared to an entirety of a plurality of the DC/DC converters present in parallel, and controls the corresponding DC/DC converter in accordance with a voltage command value having droop characteristics with respect to output power.

In the energy storage system as described above, such control that the plurality of DC/DC converters provided in parallel operate so as to be equal in their outputs is realized using the droop characteristics of the voltage command values with respect to the output powers. In addition, in order to inhibit the outputs of the plurality of DC/DC converters from becoming unequal due to error in voltage detection for the DC bus, the DC bus voltage detection values are corrected by taking in voltage detection deviations of the DC bus. Thus, it becomes possible to provide a energy storage system that uniforms the outputs among the plurality of DC/DC converters without depending on fast communication.

(8) The energy storage system of the above (7) may further include a DC/AC converter provided between the DC bus and an AC electric path, and the DC/AC converter may change an output thereof in accordance with a condition of a commercial power grid or a load connected to the AC electric path.

In a conventional energy storage system, each of the control units for the DC/DC converters receives a command value for charge/discharge power, and the DC/AC converter performs control for keeping constant the DC bus voltage which varies depending on the outputs of the DC/DC converters. Therefore, control delay in controlling charge/discharge power becomes long. In contrast, in the above energy storage system, the DC/AC converter directly receives a command value for charging/discharging and therefore control delay becomes short.

(9) In the energy storage system of the above (7), the DC/DC converter may perform current control for the corresponding DC power supply.

In this case, it is possible to configure a energy storage system in which DC power supplies are connected in parallel to a DC bus via DC/DC converters that perform current control. The DC power supplies may be, for example, a storage battery for which charge/discharge current needs to be limited depending on a state such as the SOC, or a power generation device such as a photovoltaic generator or a fuel cell.

(10) From a method aspect, disclosed is a method for controlling a plurality of DC/DC converters provided in parallel to each other between a plurality of DC power supplies and a common DC bus, the method including: correcting a voltage detection value for the DC bus by taking in an individual voltage detection deviation for the DC bus compared to an entirety of the plurality of DC/DC converters; and controlling the corresponding DC/DC converter in accordance with a voltage command value having droop characteristics with respect to output power.

In the method for controlling DC/DC converters as described above, such control that the plurality of DC/DC converters provided in parallel operate so as to be equal in their outputs can be realized using the droop characteristics of the voltage command values with respect to the output powers. In addition, in order to inhibit the outputs of the plurality of DC/DC converters from becoming unequal due to error in voltage detection for the DC bus, the DC bus voltage detection values are corrected by taking in voltage detection deviations of the DC bus. Thus, it becomes possible to uniform the outputs among the plurality of DC/DC converters without depending on fast communication.

Details of Embodiments of the Present Disclosure

Hereinafter, specific examples of a DC/DC conversion system, a energy storage system including the same, and a method for controlling DC/DC converters, according to the present disclosure, will be described with reference to the drawings.

<<Entire Configuration Including Energy Storage System>>

FIG. 1 is a single-line connection diagram of a power supply grid including a energy storage system 1. In FIG. 1, the energy storage system 1 is connected to an AC electric path $L_{AC}$. A photovoltaic system 2 is also connected to the AC electric path $L_{AC}$. A three-phase commercial power grid 3 is connected to the AC electric path $L_{AC}$ via a transformer 4. A current transformer (CT) 5 for detecting AC current is provided between the secondary side of the transformer 4 and the AC electric path $L_{AC}$. A load 6 is connected to the AC electric path $L_{AC}$.

The energy storage system 1 includes a DC power supply system 11 and a DC/AC converter 12. The DC/AC converter 12 is controlled by a control unit 13. The control unit 13 receives information of a current value detected by the CT 5.

The DC power supply system 11 includes n DC power supply devices 11_1, 11_2, . . . , 11-n (n is a natural number not less than 2) connected in parallel with each other to a common DC bus $L_{DC}$. The DC power supply device 11_1 includes a storage battery 14 which is a series string of a plurality of cells, a battery management system 15 provided along with the storage battery 14, a DC/DC converter 16 connected to the storage battery 14, and a control unit 17 for controlling the DC/DC converter. The other DC power supply devices 11_2, . . . , 11-n also have the same internal circuits. The battery management system 15 acquires various information such as the SOC about the storage battery 14, and sends the information to the control unit 17.

The photovoltaic system 2 includes an array 21A formed by connecting series strings of solar batteries 21 in parallel, and a DC/AC converter 22. An output of the array 21A is converted to AC power by the DC/AC converter 22, and then is supplied to the AC electric path $L_{AC}$. The photovoltaic system 2 can supply power as a distributed power supply to the AC electric path $L_{AC}$.

The energy storage system 1 can be charged with power supplied to the AC electric path $L_{AC}$, and in addition, can supply power to the AC electric path $L_{AC}$ through discharging. The load 6 is supplied with power from the AC electric path $L_{AC}$. During stand-alone operation without grid interconnection, power outputted from the photovoltaic system 2 can be supplied to the load 6 and also the energy storage system 1 can be charged with the power. In a case where power required by the load 6 is great or photovoltaic generation is stopped, power can be supplied from the energy storage system 1 to the load 6.

As a DC power supply of the DC power supply system 11, for example, a storage battery for which charge/discharge current needs to be limited depending on a state such as the SOC may be used, or a power generation device such as a photovoltaic generator or a fuel cell may be used.

<<Details of Circuit Configuration>>

FIG. 2 is a circuit diagram in which, as an example, two DC power supply devices 11_1, 11_2 are connected to the DC bus $L_{DC}$. In FIG. 2, two DC/DC converters are denoted by 16_1, 16_2. Two control units are denoted by 17_1, 17_2. On the DC power supply device 11_1 side, the storage battery 14 and the BMS 15 are connected to the DC/DC converter 16_1. On the DC power supply device 11_2 side, the storage battery 14 and the BMS 15 are connected to the DC/DC converter 16_2.

The DC/DC converter 16_1 includes a smoothing capacitor 161, a DC reactor 162, a low-side switching element $Q_L$, a high-side switching element $Q_H$, and a smoothing capacitor 163 on the DC bus $L_{DC}$ side, and these components are connected as shown in the drawing. In addition, as devices for measurement, a voltage sensor 165 for detecting a voltage on the low-voltage side of the DC/DC converter 16_1, a current sensor 166 for detecting a current flowing through the DC reactor 162, and a voltage sensor 167 for detecting a voltage between two lines of the DC bus $L_{DC}$, are provided. Signals indicating information of the BMS 15 and detection values outputted from the respective sensors are sent to the control unit 17_1.

The DC/DC converter 16_2 also has the same internal circuit configuration, and therefore the same reference signs are assigned and the description thereof is omitted.

A plurality of configuration sets for DC/DC conversion, i.e., in this example, the DC/DC converter 16_1 and the control unit 17_1, and the DC/DC converter 16_2 and the control unit 17_2, are considered to form a DC/DC conversion system 100 provided between a plurality of DC power supplies (14) and a common DC bus ($L_{DC}$), when expressed in a generalized manner.

The DC/AC converter 12 includes a smoothing capacitor 121, switching elements Q1, Q2, Q3, Q4, Q5, Q6 in a three-leg full-bridge form, AC reactors 122 provided on three electric paths on the AC side, and capacitors 123 forming LC circuits together with the AC reactors 122, and these components are connected as shown in the drawing. In addition, as devices for measurement, a voltage sensor 124 for detecting a voltage between two lines of the DC bus $L_{DC}$, voltage sensors 124, 125, 126 for detecting voltages between the three AC electric paths, and current sensors 127, 128, 129 for detecting currents flowing through the three AC electric paths, are provided. Signals of detection values outputted from the respective sensors are sent to the control unit 13.

As the switching elements $Q_L$, $Q_H$, Q1, Q2, Q3, Q4, Q5, Q6, for example, insulated gate bipolar transistors (IGBT) may be used as shown in the drawing, but instead, metal-oxide-semiconductor field-effect transistors (MOS-FET) may be used.

The control units 17_1, 17_2 and the control unit 13 can communicate with a management control unit 18 (either via wires or wirelessly). The control units 13, 17_1, 17_2, and the management control unit 18 each include a computer and implement necessary control functions by the computer executing software (computer program), for example. The software is stored in a memory device (not shown) of each of the control units 13, 17_1, 17_2 and the management control unit 18.

In FIG. 1 and FIG. 2, the plurality of DC/DC converters 16 (16_1, 16_2) connected in parallel with each other to the DC bus $L_{DC}$ are each controlled independently so that the DC bus voltage becomes constant, through control described later by the control units 17 (17_1, 17_2). Therefore, for the DC/AC converter 12, control for making the DC bus voltage constant is unnecessary not only in stand-alone operation but also in grid interconnection operation, and it is only necessary to control the output power in accordance with a command value from the control unit 13.

That is, communication means for transmitting power command values to the plurality of DC/DC converters in real time is not needed. It suffices that the AC power command value is recognized only by the control unit 13 for the DC/AC converter 12.

<<Droop Characteristics>>

Figure 3:
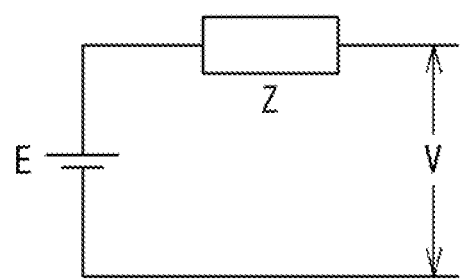
FIG. 3 shows an equivalent model of a DC/DC converter.

FIG. 3 shows an equivalent model of the DC/DC converter. Here, the output voltage (DC bus voltage) of the DC/DC converter is denoted by E, a line impedance between the DC/DC converter and a load (in the circuit configuration shown in FIG. 1 and FIG. 2, the DC/AC converter 12) is denoted by Z, and a voltage supplied to the load is denoted by V. In this case, an output current I of the DC/DC converter is represented by the following Expression (1).

$$I=(E-V)/Z \quad (1)$$

In Expression (1), Z is assumed to be a pure resistance R. In this case, power P outputted from the DC/DC converter is represented by the following Expression (2).

$$P=VI=(EV-V^2)/R \quad (2)$$

By deforming Expression (2), the following Expression (3) is obtained.

$$E=(R/V)P+V \quad (3)$$

From Expression (3), the output voltage E is proportional to the output power P. Accordingly, the characteristics of a voltage command value E* are represented by the following Expression (4) as a function for performing negative feedback with a proportionality coefficient f with respect to the output power P.

$$E^*=E_{ref}-f(P-P_{ref}) \quad (4)$$

Here, $E_{ref}$ and $P_{ref}$ denote reference values for the output voltage (DC bus voltage) and the output power of the DC/DC converter, respectively. The control units 17 (17_1,  17_2) of all the DC/DC converters 16 (16_1, 16_2) each repeat calculation of Expression (4) independently, at 20 kHz, for example.

Figure 4:
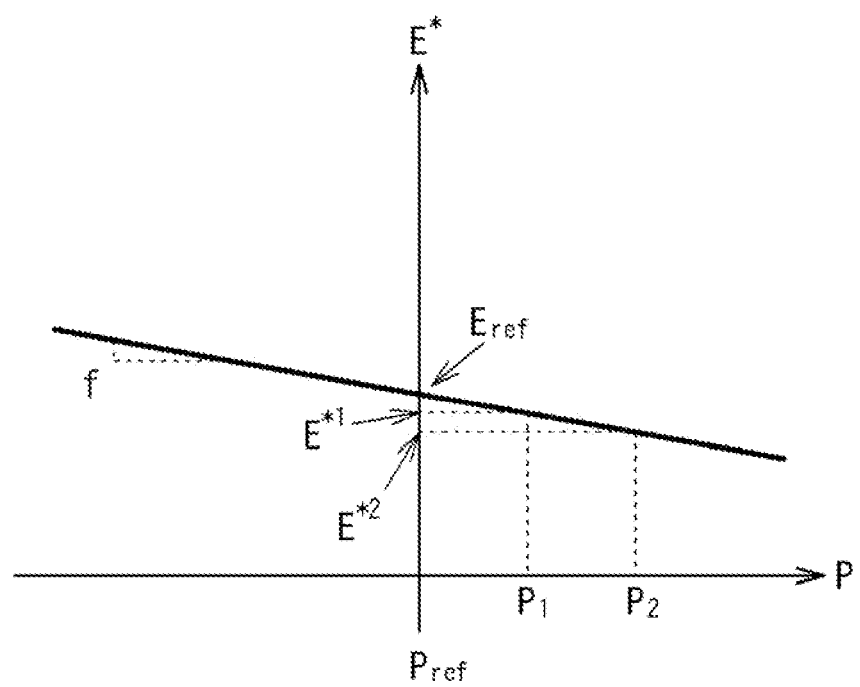
FIG. 4 shows a graph of Expression (4).

FIG. 4 shows a graph of Expression (4). In FIG. 4, with respect to the output power P, the voltage command value E* has droop characteristics with a slope (–f) based on the proportionality coefficient f. If $P=P_{ref}$ is satisfied, $E^*=E_{ref}$ is satisfied. For example, it is assumed that one of the two DC/DC converters (e.g., DC/DC converter 16_1) is at a coordinate point $(P_1, E^{*1})$ on the droop characteristics and the other one (DC/DC converter 16_2) is at $(P_2, E^{*2})$. In this case, relatively, for the one having smaller output power, the voltage target value becomes higher, and for the one having greater output power, the voltage target value becomes lower. As a result, the DC/DC converter 16_1 operates to increase the output power, and the DC/DC converter 16_2 operates to decrease the output power. Thus, the two DC/DC converters 16_1, 16_2 converge in such a direction that their output powers become equal to each other.

<<Control Block Diagram of DC/DC Converter>>

Figure 5:
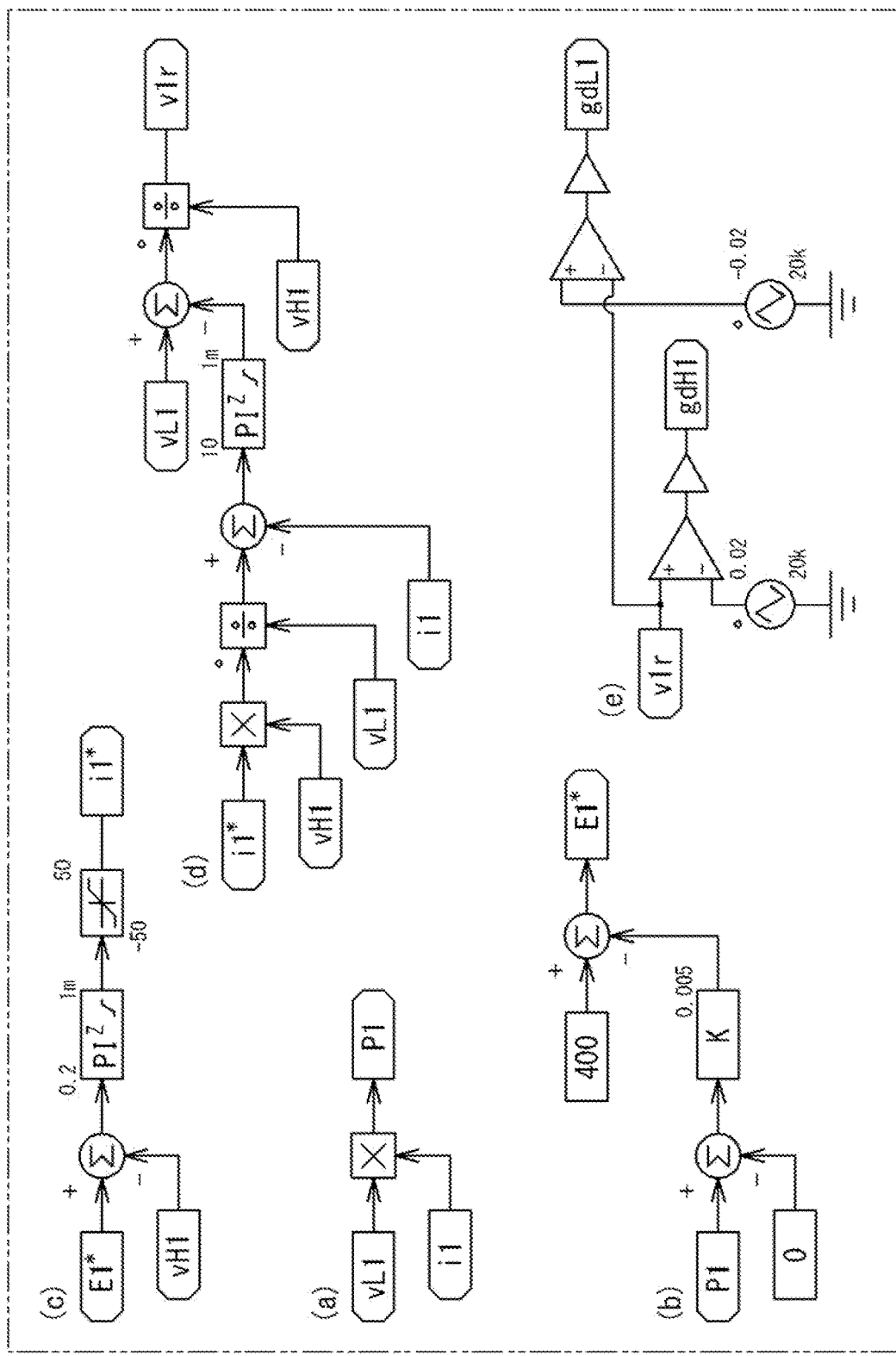
FIG. 5 is an example of a control block diagram of the DC/DC converter.

FIG. 5 is an example of a control block diagram of the DC/DC converter. In (a) of FIG. 5, a product of a low-voltage-side voltage vL1 and a current i1 of the DC/DC converter is power P1. Next, in (b), the proportionality coefficient f in Expression (4) of the droop characteristics with respect to the power P1 is set at 0.005, and a reference value $E_{ref}$ for the DC bus voltage is set at 400 [V], whereby a voltage command value E1* is generated. Next, in (c), a difference between the voltage command value E1* and an actual high-voltage-side voltage vH1 is subjected to proportional integral processing and limiter processing, to obtain a current command value i1*. Thereafter, the same control as general DC/DC converter control is performed, so that a voltage referential value v1r is generated in (d). Then, in (e), the voltage referential value v1r and a triangular wave (20 kHz) are combined, whereby a gate drive signal gdH1 for the high side, and a gate drive signal gdL1 for the low side inverted therefrom, can be obtained.

<<Verification>>

(Effect of Droop Control)

Figure 6:
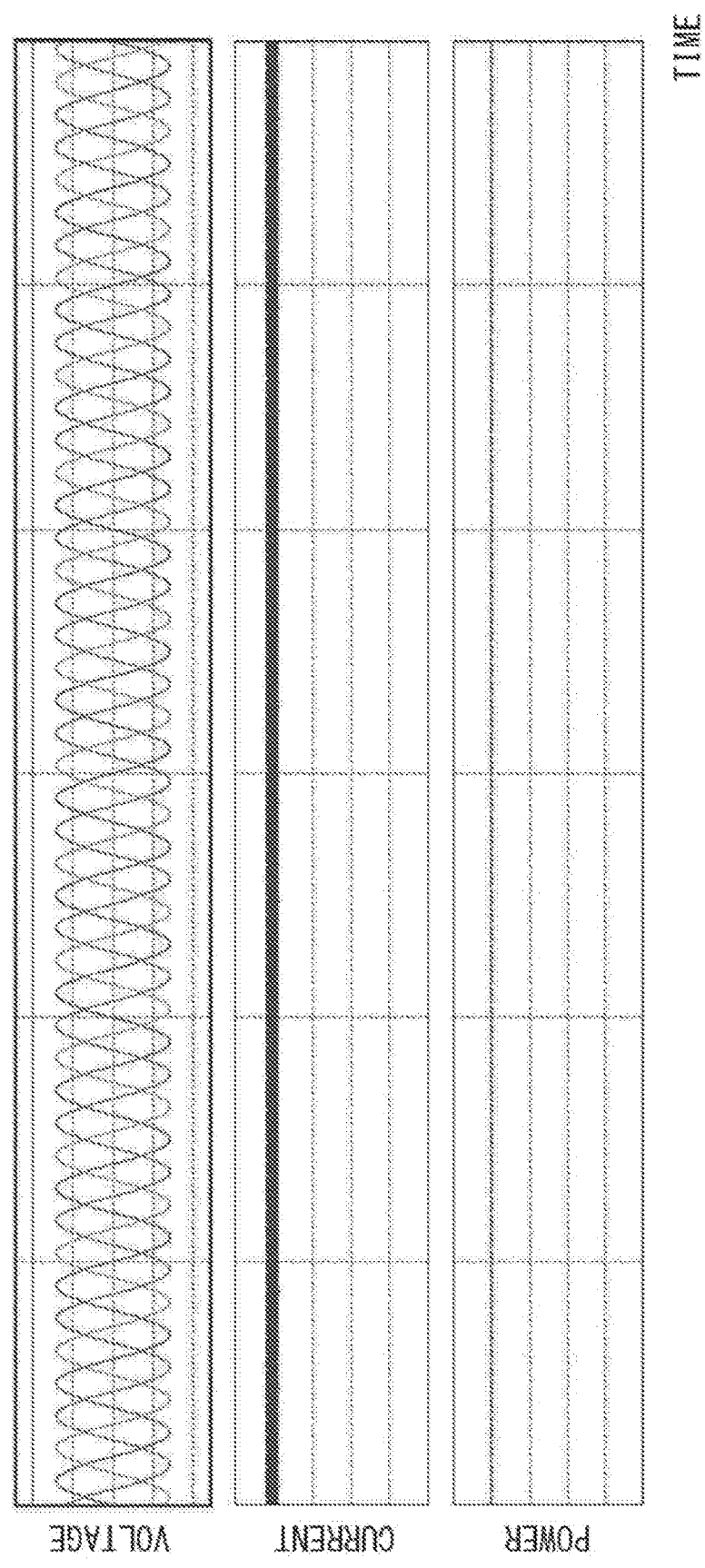
FIG. 6 shows graphs representing the state of the energy storage system operated with two DC/DC converters connected in parallel without performing droop control, for comparison's sake, under the condition that a difference between voltage detection values in the two DC/DC converters was 0 and a difference between wiring impedances of their circuits was 0.
Figure 7:
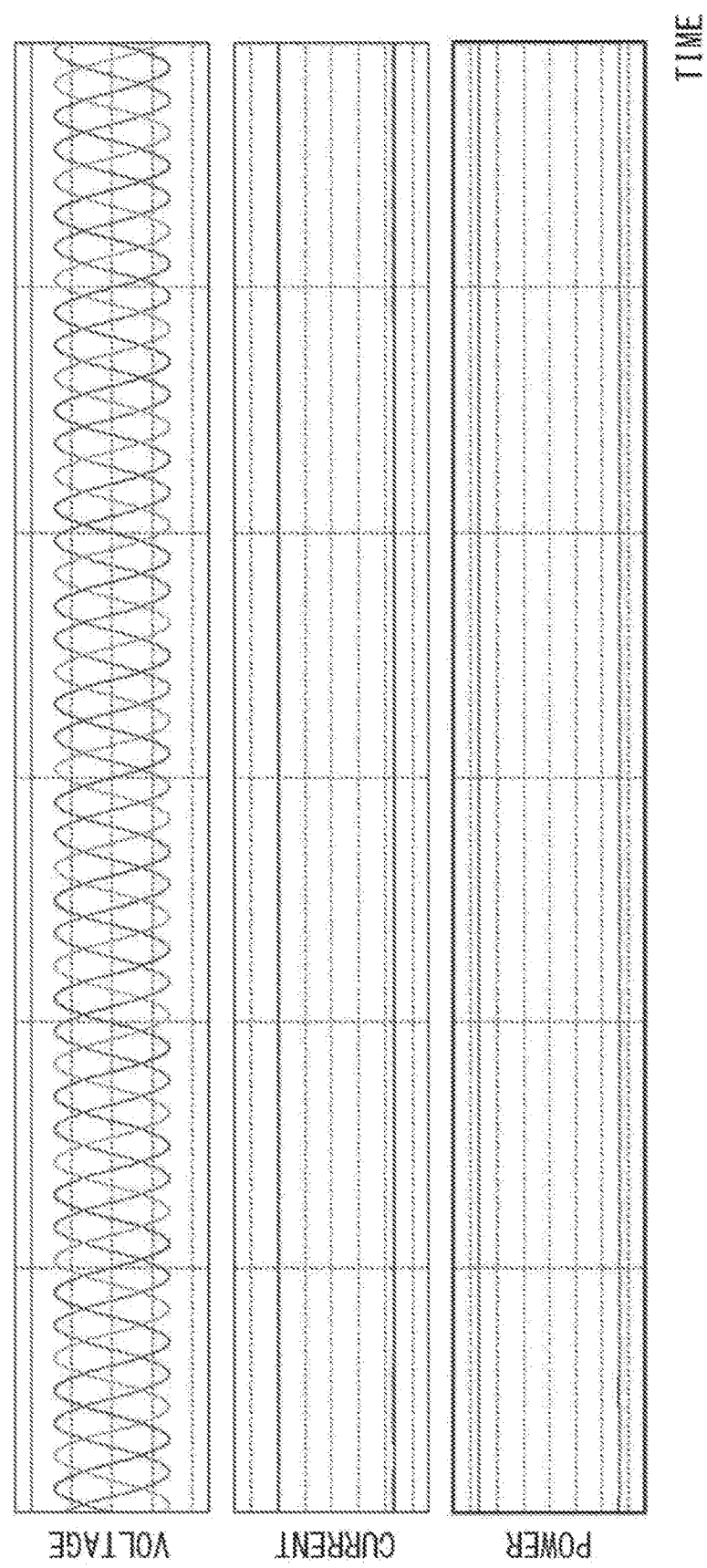
FIG. 7 shows graphs representing the state of the energy storage system operated with two DC/DC converters connected in parallel without performing droop control, for comparison's sake, under the condition that a difference between voltage detection values in the two DC/DC converters was 0.1% and a difference between wiring impedances was 0.

FIG. 6 and FIG. 7 show graphs representing the state of the energy storage system operated with the two DC/DC converters connected in parallel without performing control for imparting the droop characteristics (hereinafter, referred to as droop control), for comparison's sake. The horizontal axis indicates time. In each of FIG. 6 and FIG. 7, the graph at the upper stage shows the three-phase AC output voltages of the DC/AC converter and the DC bus voltage which is higher than the peak values of the AC output voltages. The graph at the middle stage shows two storage battery currents corresponding to the two DC/DC converters. The graph at the lower stage shows the output powers of the two DC/DC converters.

In FIG. 6, a condition was set such that a difference between voltage detection values in the two DC/DC converters was 0 and a difference between wiring impedances of their circuits was 0. In this case, the two storage battery currents had slight fluctuations due to ripple but were approximately equal to each other, thus appearing to be one thick line. The output powers (lower stage) of the two DC/DC converters were equal to each other at 2024 W. However, it is difficult to achieve such an ideal state in actuality. Even if calibration for the detection circuits for the DC bus voltage detection values is precisely performed, it is inevitable that a difference of about ±1 V arises between the two voltage detection values due to offset variations of amplifiers through temperature change, or the like. In addition, even if the wiring impedances are designed to be equal to each other with as much effort as possible, it is difficult to make the error not greater than 10%.

In FIG. 7, a condition was set such that a difference between voltage detection values in the two DC/DC converters was 0.1% and a difference between wiring impedances was 0. In this case, regarding one DC/DC converter, the storage battery current reached a current upper limit value of 30 A, and the power was 7408 W in discharging. Regarding the other DC/DC converter, the storage battery current was −13 A, and the power was 3281 W in charging. Thus, it is found that such a slight difference of 0.1% between the DC bus voltage detection values of the two DC/DC converters causes great separation between their outputs.

Next, the state of the energy storage system in a case of performing the droop control will be described.

In control of the DC/DC converter, the sign of power when the storage battery is discharged to output the power to the DC bus is defined as positive. In Expression (4), the reference value $E_{ref}$ for the DC bus voltage is set at 400 V, the reference value $P_{ref}$ for the output power of the DC/DC converter is set at 0 W, and the proportionality constant f is set at 0.005. In this case, the DC bus voltage command value $E^*$ for the DC/DC converter is 350 V when the output power is 10 kW (discharge), and is 450 V when the output power is −10 kW (charge). The proportional gain for DC bus voltage control is lowered to 0.2 because setting the same value of 10 as in the case of not performing droop control causes oscillation.

FIG. 8 to FIG. 11 show graphs representing the state of the energy storage system operated with the two DC/DC converters connected in parallel in the case of performing the droop control. The horizontal axis indicates time. In each drawing, the graph at the upper stage shows the three-phase AC output voltages of the DC/AC converter and the DC bus voltage which is higher than the peak values of the AC output voltages. The graph at the middle stage shows two storage battery currents corresponding to the two DC/DC converters. The graph at the lower stage shows the output powers of the two DC/DC converters.

Figure 8:
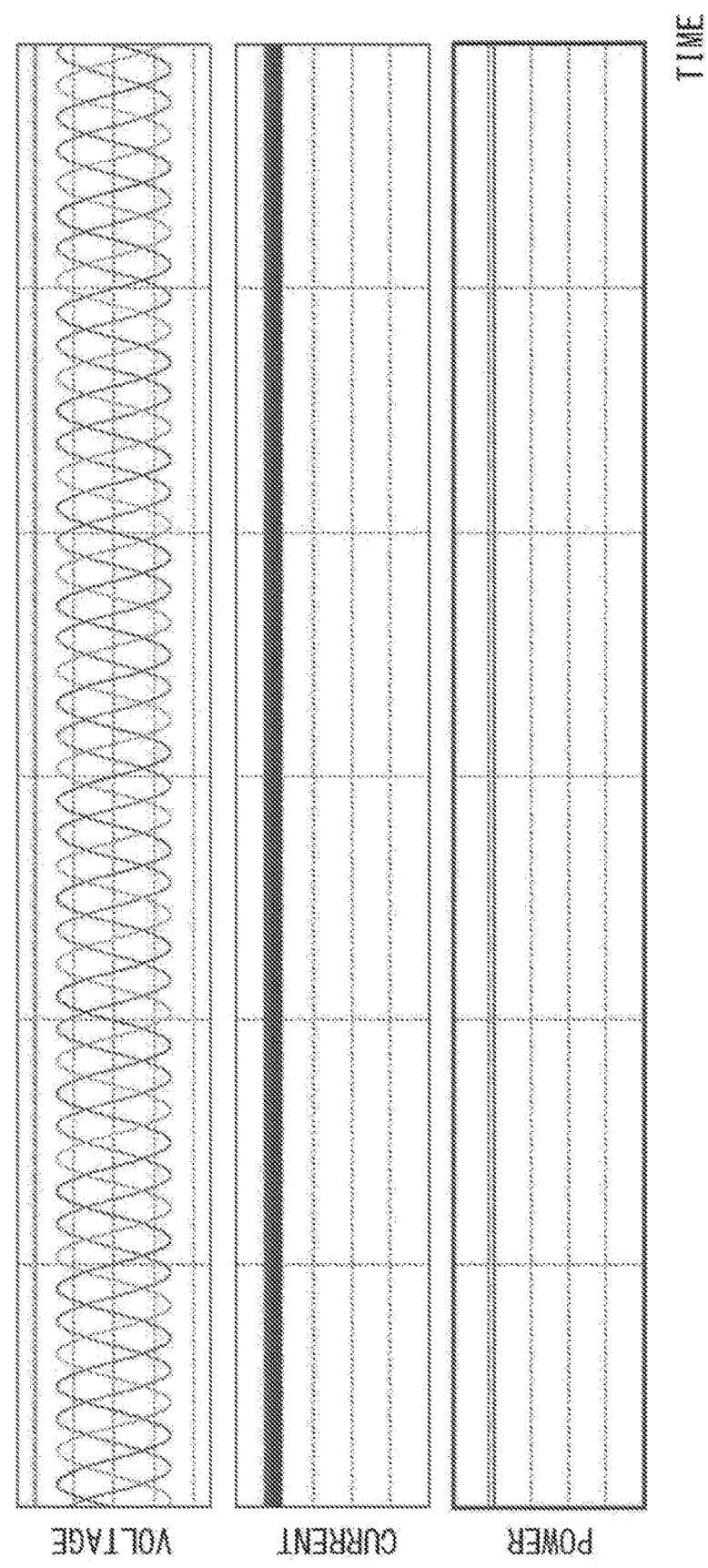
FIG. 8 shows graphs representing the state of the energy storage system operated with two DC/DC converters connected in parallel in a case of performing droop control, under the condition that a difference between DC bus voltage detection values was 0.1% and a difference between wiring impedances was 0.

In FIG. 8, a condition was set such that a difference between the DC bus voltage detection values was 0.1% and a difference between wiring impedances was 0. As a result, the output powers of the two DC/DC converters were 2063 W and 1985 W, respectively, and their differences from an average value of 2024 W therebetween were ±1.9%. That is, although not equal to each other, the powers of the two DC/DC converters are close to each other.

Figure 9:
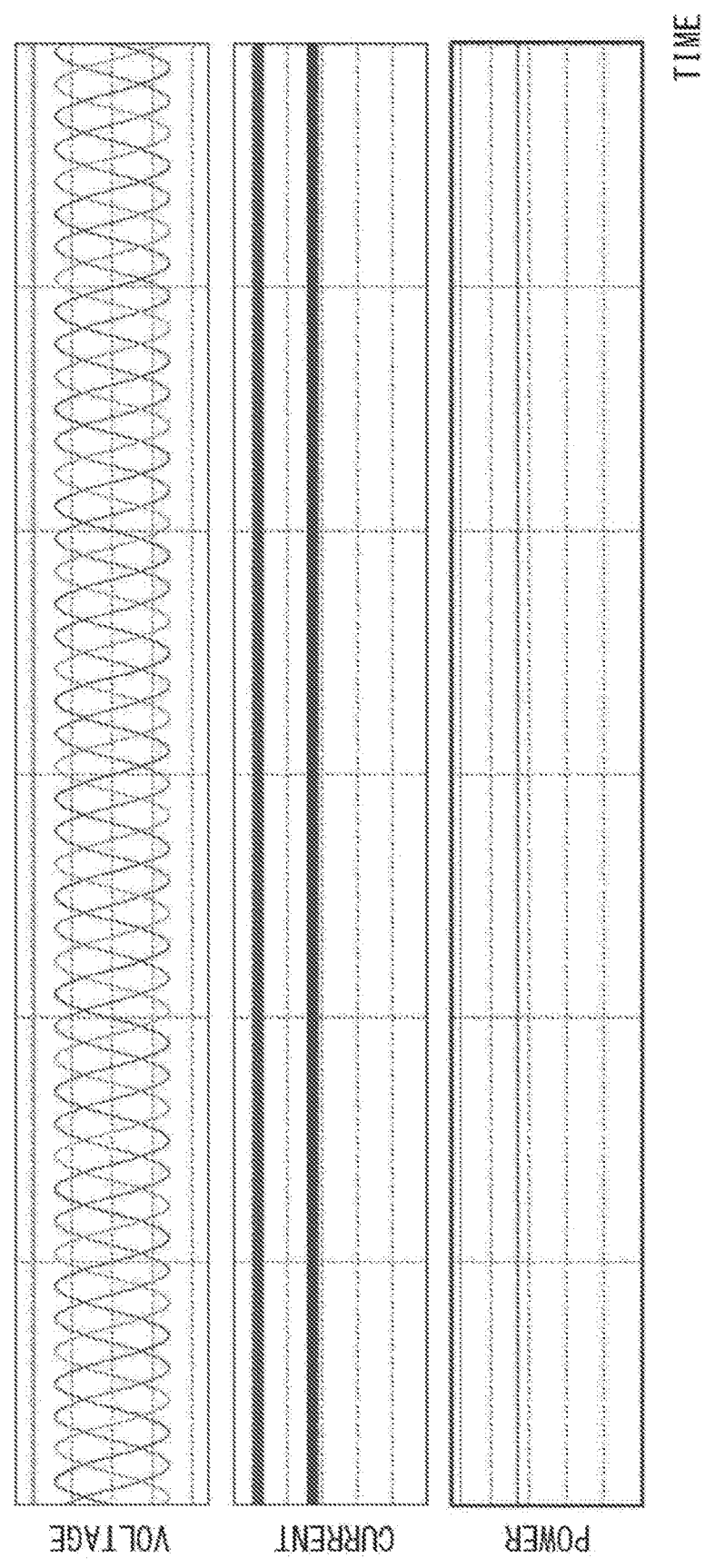
FIG. 9 shows graphs representing the state of the energy storage system operated with two DC/DC converters connected in parallel in a case of performing droop control, under the condition that a difference between DC bus voltage detection values was increased to 1% and a difference between wiring impedances was 0.

In FIG. 9, a condition was set such that a difference between the DC bus voltage detection values was increased to 1% and a difference between wiring impedances was 0. As a result, the output powers of the two DC/DC converters were 2410 W and 1638 W, respectively, and their differences from the average value therebetween were increased to ±19%.

Figure 10:
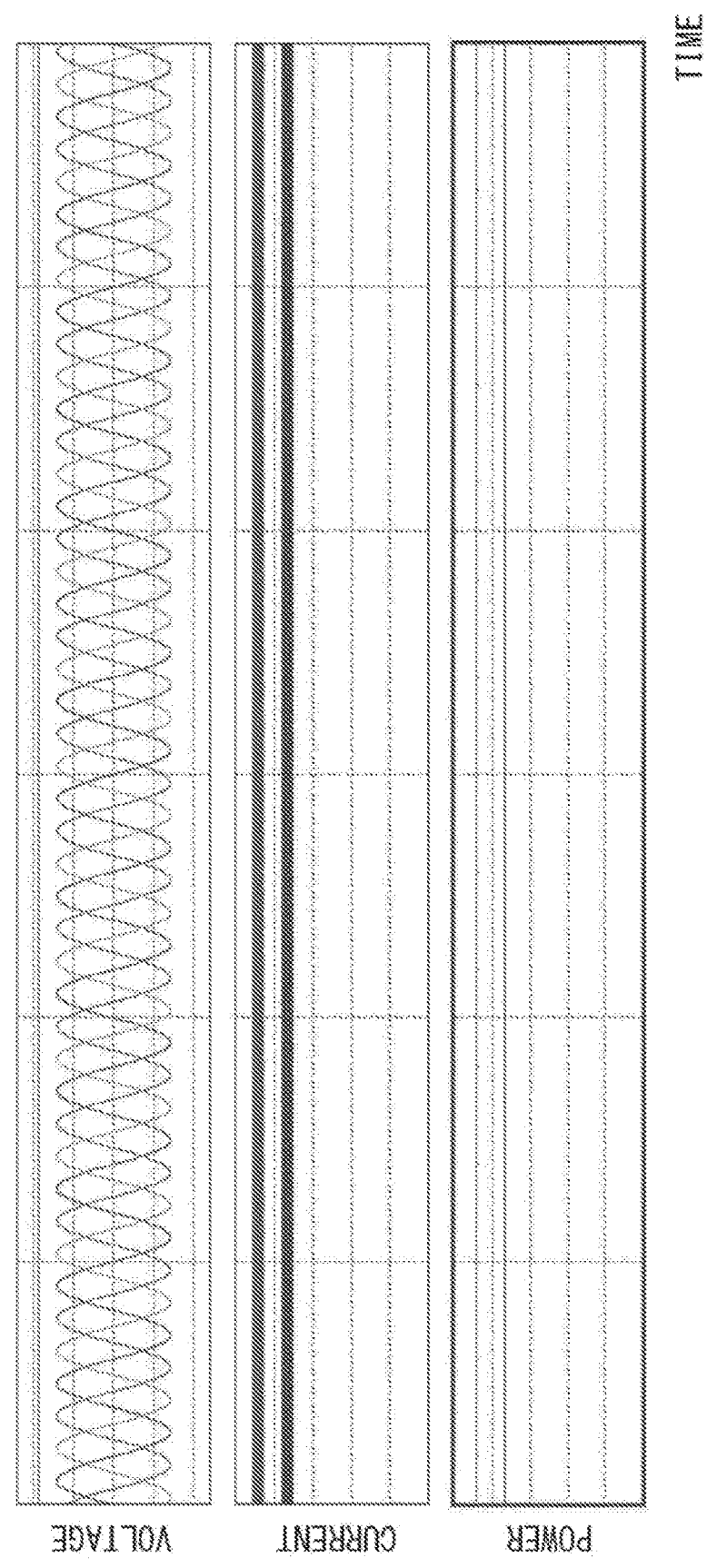
FIG. 10 shows graphs representing the state of the energy storage system operated with two DC/DC converters connected in parallel in a case of performing droop control, under the condition that a proportionality constant for the droop control was 0.01, i.e., two times 0.005, a difference between DC bus voltage detection values was 1%, and a difference between wiring impedances was 0.

In FIG. 10, a condition was set such that the proportionality constant for the droop control was 0.01, i.e., two times 0.005, a difference between the DC bus voltage detection values was 1%, and a difference between the wiring impedances was 0. As a result, the output powers of the two DC/DC converters were 2212 W and 1836 W, respectively, and their differences from the average value therebetween were ±9%.

Figure 11:
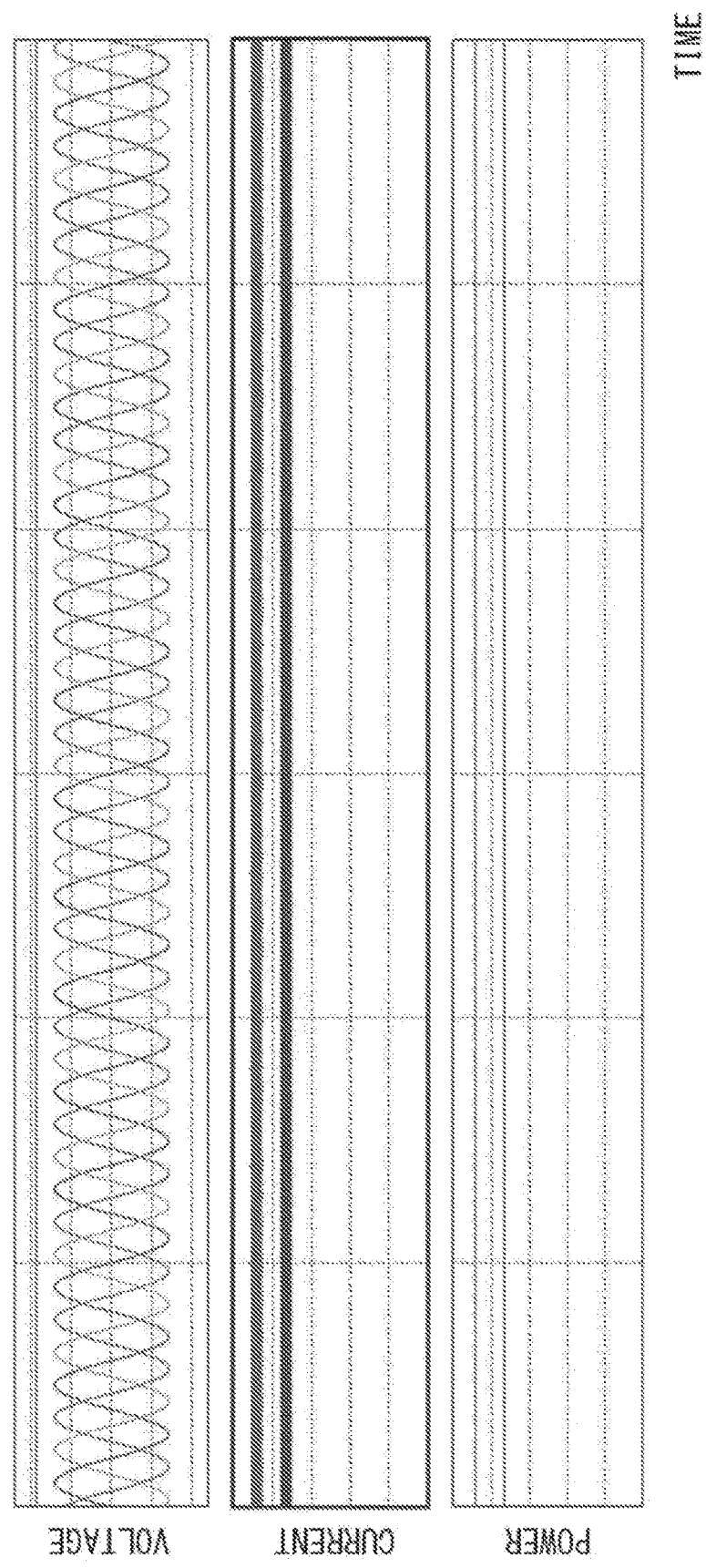
FIG. 11 shows graphs representing the state of the energy storage system operated with two DC/DC converters connected in parallel in a case of performing droop control, under the condition that a proportionality constant for the droop control was 0.01, a difference between DC bus voltage detection values was 1%, and a difference between wiring impedances was not 0 but was set such that one was two times the other.

In FIG. 11, a condition was set such that the proportionality constant for the droop control was 0.01, a difference between the DC bus voltage detection values was 1%, and a difference between wiring impedances was not 0 but was set such that one was two times the other. As a result, the output powers of the two DC/DC converters were 2215 W and 1833 W, respectively. This result has almost no differences as compared to the result in FIG. 10. That is, it is understood that a difference between wiring impedances does not significantly influence the result.

From the above results, it is found that a difference between the DC bus voltage detection values rather than wiring impedances has a greater influence on output variations of the DC/DC converters. In addition, it is found that, as the proportionality constant f for the droop control is increased, the effect of suppressing output variations due to a difference between the DC bus voltage values is obtained more greatly. However, even when the proportionality constant f was set at 0.01, differences of the output powers of the two DC/DC converters from the average value therebetween were still ±9%. In addition, in this case, the DC bus voltage command value $E^*$ is reduced to 300 V when the output power is 10 kW (discharge). This voltage value is not a sufficient value for conversion to AC 200 V in the DC/AC converter.

When the output power of the DC/DC converter is −10 kW (charge), the DC bus voltage command value $E^*$ is 500 V. This value is a sufficient value for conversion to AC 200 V, but is excessively high for the DC bus voltage so that power loss in the DC/AC converter increases. It is necessary to make adjustment for reducing output variations of the DC/DC converters without much increasing the proportionality constant f for the droop control so that the change range of the DC bus voltage does not become too wide.

<<Droop Control and Correction for Voltage Detection Value>>

Figure 12:
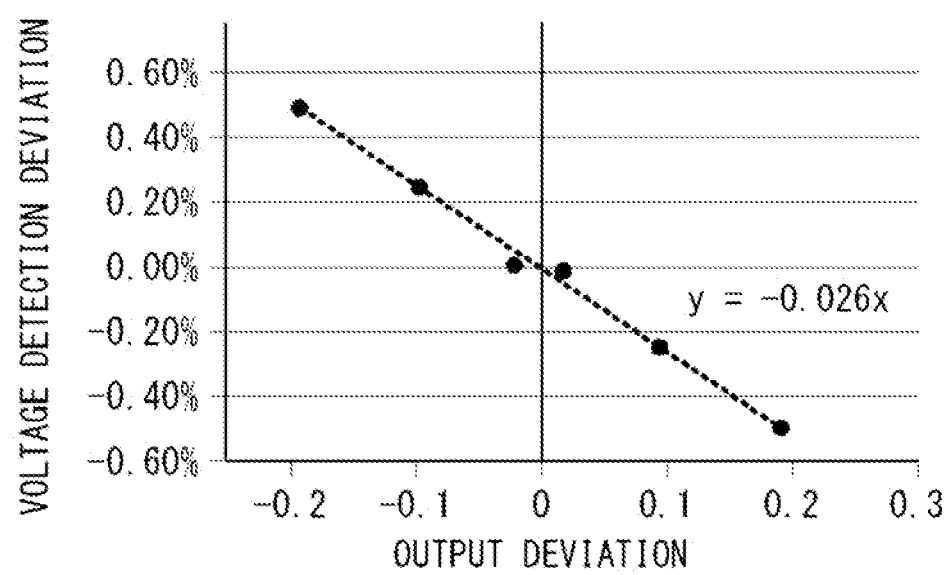
FIG. 12 shows graphs representing the relationship between an output deviation and a voltage detection deviation.

FIG. 12 shows graphs representing the relationship between an output deviation and a voltage detection deviation. This graph is obtained by plotting the relationship between a deviation (output deviation (ratio)) of the output of the DC/DC converter from the average value and an individual deviation (voltage detection deviation) compared to the average value (entirety) of the DC bus voltage detection values in a case where the proportionality constant f for the droop control was set at 0.005 as described above, and then drawing an approximation line from the plotted points. From this graph, it is found that the output deviation and the voltage detection deviation are in a proportional relationship.

Accordingly, the voltage detection value can be corrected on the basis of the output deviation. For example, when the output deviation is +19%, the deviation of the DC bus voltage detection value is −0.494% from the approximation line. Therefore, the voltage detection value can be corrected by dividing the voltage detection value by (1−0.00494)=0.99506. In practice, at a site where the energy storage system is installed, trial operation may be performed with an output of about 20% of the rated value after the system is constructed, and then a correction coefficient for the DC bus voltage detection value of each DC/DC converter may be determined from the output deviation. Using such correction coefficients, the DC bus voltage detection values of the two DC/DC converters were corrected.

Figure 13:
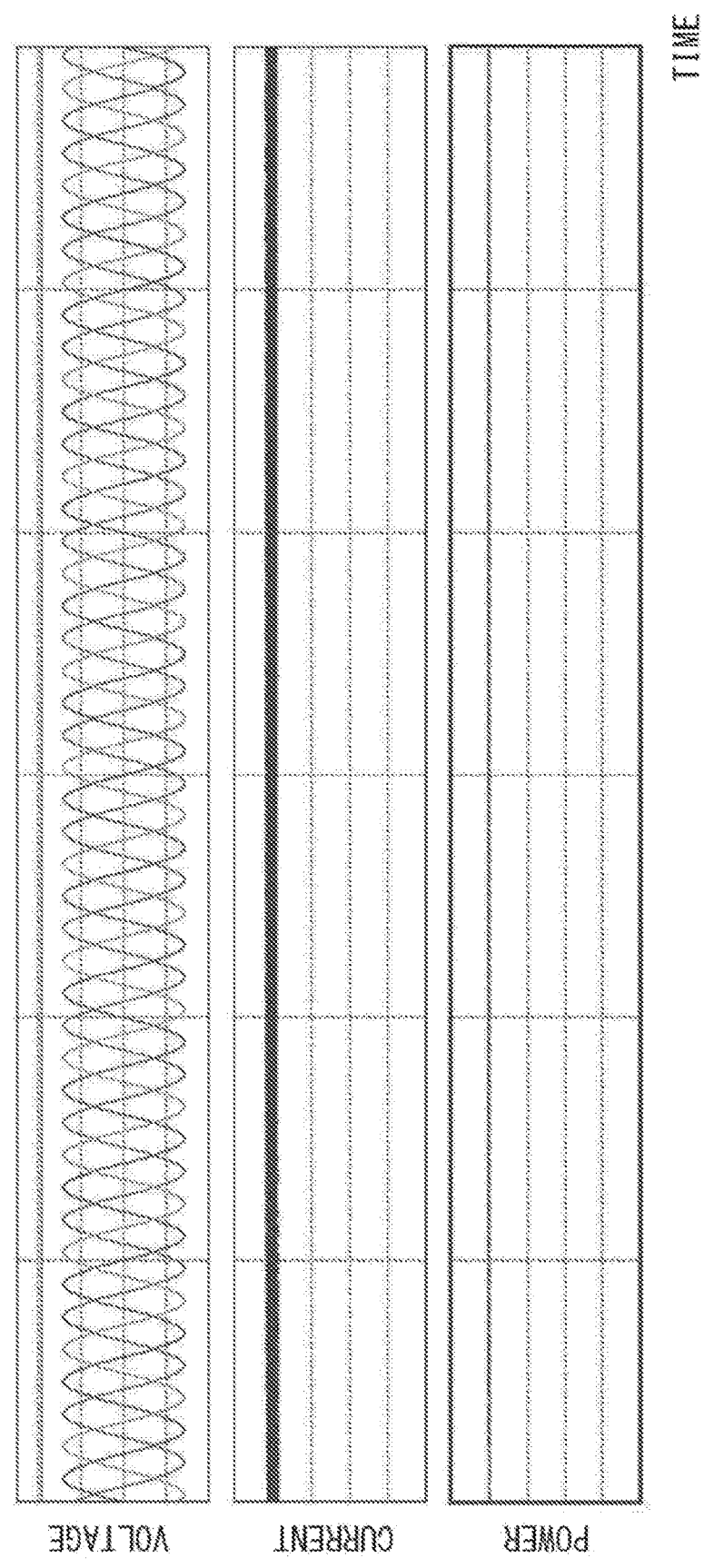
FIG. 13 shows graphs representing the state of the energy storage system operated with two DC/DC converters connected in parallel in a case of performing correction in addition to droop control, under the condition that a proportionality constant f for droop control was 0.005, a difference between DC bus voltage detection values was 1%, and a difference between wiring impedances was 0.
Figure 14:
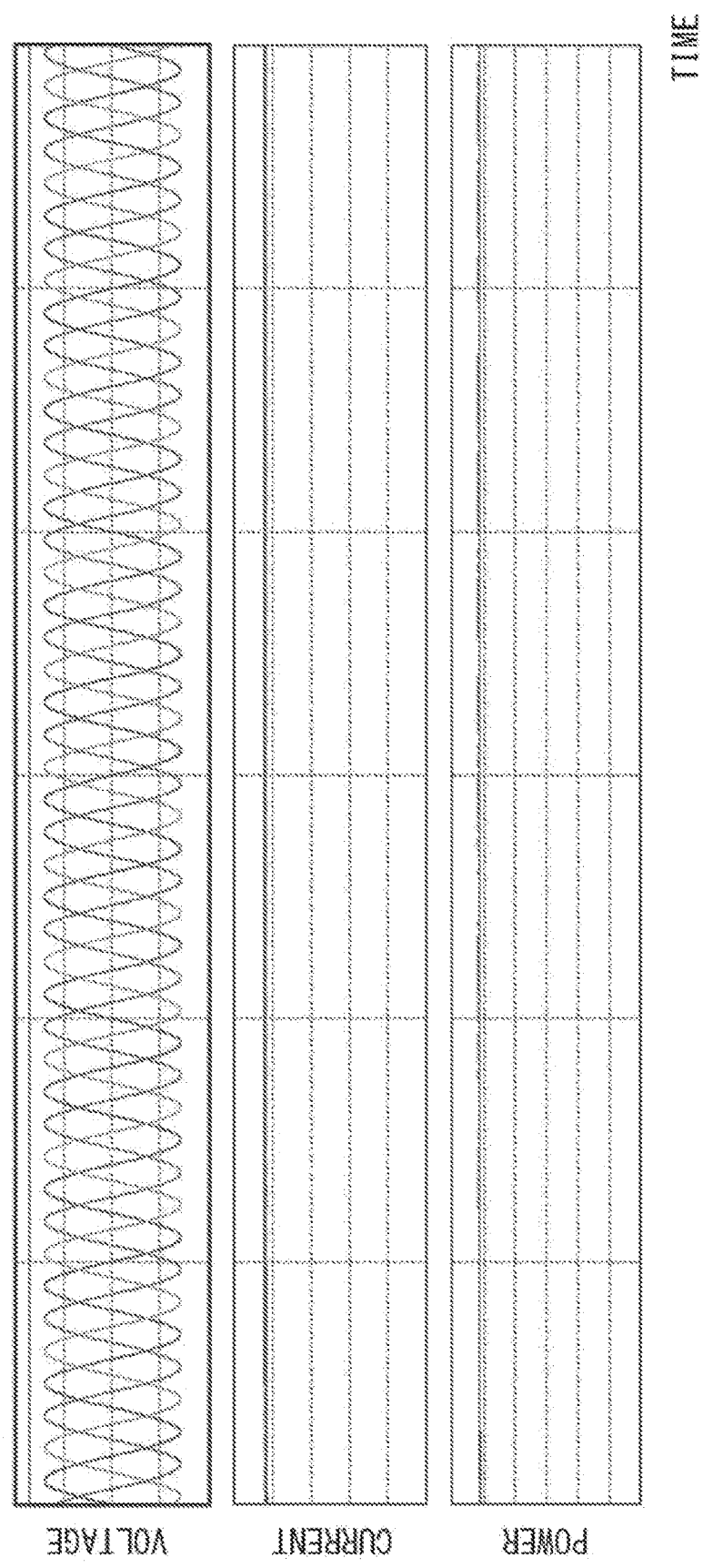
FIG. 14 shows graphs representing the state of the energy storage system operated with two DC/DC converters connected in parallel in a case of performing correction in addition to droop control, where the same condition and correction as those in FIG. 13 were applied and a resistance load connected between lines on the AC side of a DC/AC converter was changed from 10Ω to 2Ω.

FIG. 13 and FIG. 14 show graphs representing the state of the energy storage system operated with the two DC/DC converters connected in parallel in a case of performing the above correction in addition to the droop control. The horizontal axis indicates time. In each drawing, the graph at the upper stage shows the three-phase AC output voltages of the DC/AC converter and the DC bus voltage which is higher than the peak values of the AC output voltages. The graph at the middle stage shows two storage battery currents corresponding to the two DC/DC converters. The graph at the lower stage shows the output powers of the two DC/DC converters.

In FIG. 13, a condition was set such that the proportionality constant f for the droop control was 0.005, a difference between the DC bus voltage detection values was 1%, and a difference between wiring impedances was 0. This condition is the same as in FIG. 9. Then, the DC bus voltage detection values of the two DC/DC converters were corrected using correction coefficients obtained by applying the output deviations in FIG. 9 to the approximation line in FIG. 12. As a result, the output powers of the two DC/DC converters were 2024 W and 2019 W, respectively, and thus were almost equal to each other. Their deviations from the average value were small at ±0.135%. In the graph in FIG. 13, the output powers of the two DC/DC converters overlap each other, thus appearing to be one line.

In FIG. 14, the same condition and correction as those in FIG. 13 were applied and a resistance load connected between lines on the AC side of the DC/AC converter was changed from 10Ω to 2Ω. In this case, the output powers of the DC/DC converters were 10.330 kW and 10.325 kW, respectively, and thus were almost equal to each other. Their deviations from the average value were slight at ±0.02%. In the graph in FIG. 14, the output powers of the two DC/DC converters overlap each other, thus appearing to be one line. Also, the DC bus voltage was stabilized at about 350 V.

Figure 15:
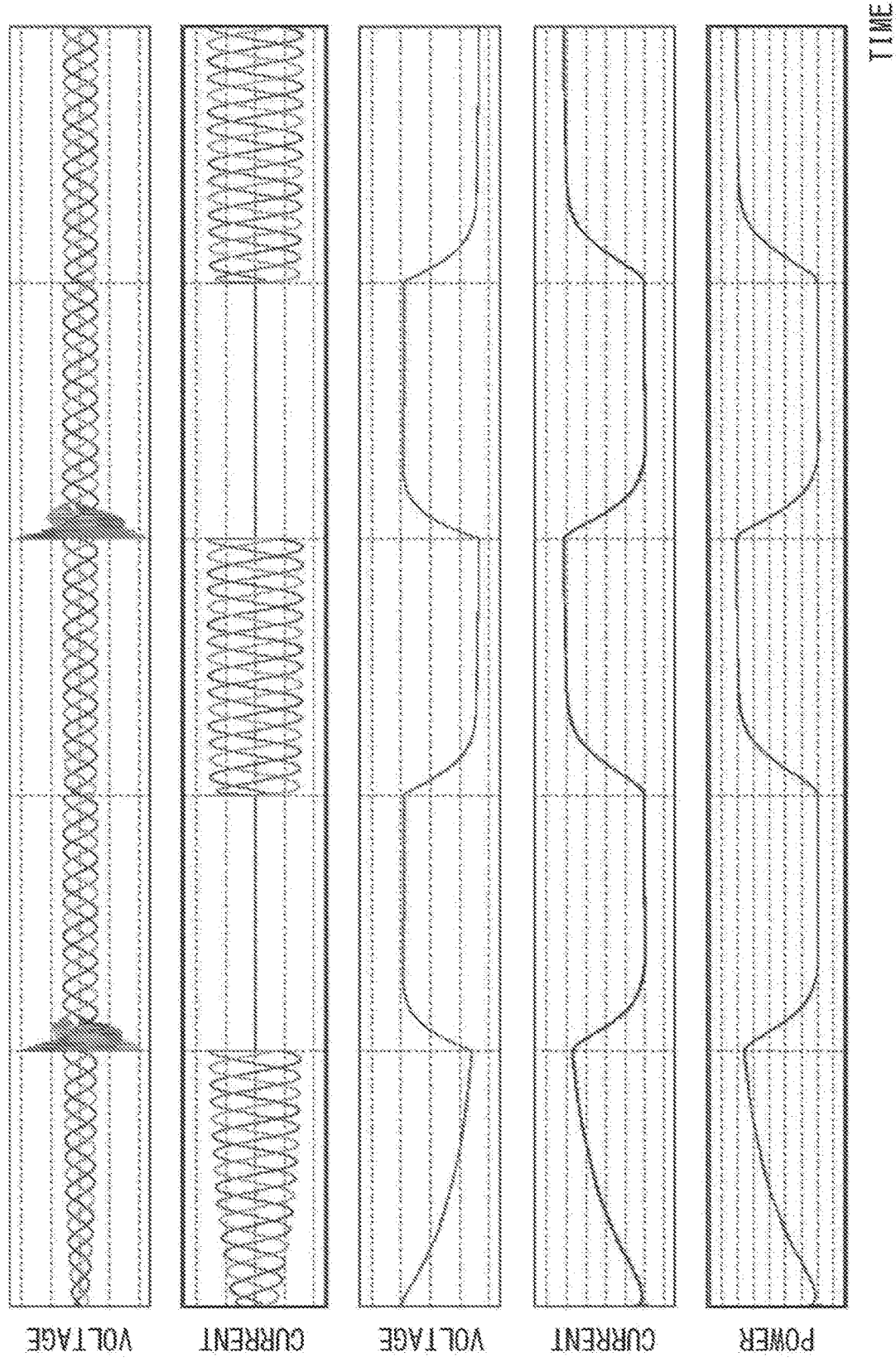
FIG. 15 shows graphs representing the state of the energy storage system operated with two DC/DC converters connected in parallel in a case of performing correction in addition to droop control, while a severe condition was intentionally applied to load connection.

FIG. 15 shows graphs representing the state of the energy storage system operated with the two DC/DC converters connected in parallel in a case of performing the correction in addition to the droop control, while a severe condition was intentionally applied to load connection. The horizontal axis indicates time. The graph at the first stage from the top shows the three-phase AC output voltages of the DC/AC converter. The graph at the second stage shows the three-phase AC output currents of the DC/AC converter. The graph at the third stage shows the DC bus voltage. The graph at the fourth stage shows two storage battery currents corresponding to the two DC/DC converters. The graph at the fifth stage shows the output powers of the two DC/DC converters.

In FIG. 15, a condition was set such that the proportionality constant f for the droop control was 0.005, a difference between the DC bus voltage detection values was 1%, and a difference between wiring impedances was 0. This condition is the same as in FIG. 9. Then, the DC bus voltage detection values of the two DC/DC converters were corrected using correction coefficients obtained by applying the output deviations in FIG. 9 to the approximation line in FIG. 12. In addition, in FIG. 15, for intentionally applying a severe condition, three resistance loads each having a resistance value of 2Ω were repeatedly connected/disconnected at a 0.2-second cycle. As a result, the output voltage of the DC/AC converter was disturbed immediately after the loads were disconnected, but except for this, the AC voltages were stably outputted at a line-to-line voltage value of 200 V. The DC bus voltage came into a steady state at 350 V when the loads were connected and at 400 V when the loads were disconnected, and thus, including a transient intermediate voltage state between these states, the DC bus voltage was stable. The output powers of the two DC/DC converters were equal to each other in both of a steady state and a transient state.

<<Summary of Above>>

As described above, droop characteristics in which the DC bus voltage command value for each DC/DC converter is changed with negative feedback applied by the output power, are imparted, and further, a feature of correcting the DC bus voltage detection value by a deviation of the output power from the average value is adopted in combination. Then, it has been confirmed that such a configuration enables control for keeping the DC bus voltage at a constant value by a plurality of DC/DC converters without depending on communication.

<<Parallel Operation of Three or More DC/DC Converters>>

Next, parallel operation of three or more DC/DC converters will be considered. That is, as the DC power supply devices in FIG. 1 and FIG. 2, three DC power supply devices 11_1, 11_2, 11_3 are operated in parallel.

First, a simulation for obtaining correction coefficients for DC bus voltage detectors was performed. Error ratios for the DC bus voltage detectors of the three DC/DC converters were set at +1%, ±0%, and −1%, respectively, and a resistance load of 10Ω was connected between the AC-side lines. The correction coefficients were all set at 1. Where an output deviation $\delta_i$ is defined by the following Expression (5), the values of $\delta_i$ for the three DC/DC converters were −0.580, 0, +0.580.

It is noted that, in the description, different kinds of fonts are used for representing symbols and mathematical expressions, but there is no meaning in difference among the fonts and the same characters denote the same physical quantities.

$$\delta_i = \frac{P_i - <P_i>_{i=1,2,3}}{<P_i>_{i=1,2,3}}, \qquad (5)$$

$$<P_i>_{i=1,2,3} = \frac{1}{3}\sum_{k=1}^{3} P_k$$

In addition, error ratios for the DC bus voltage detectors of the three DC/DC converters were set at +0.5%, ±0%, −0.5%, respectively, and a resistance load of 10Ω was connected between the AC-side lines. In this case, the values of $\delta_i$ for the three DC/DC converters were −0.290, 0, +0.290.

Figure 16:
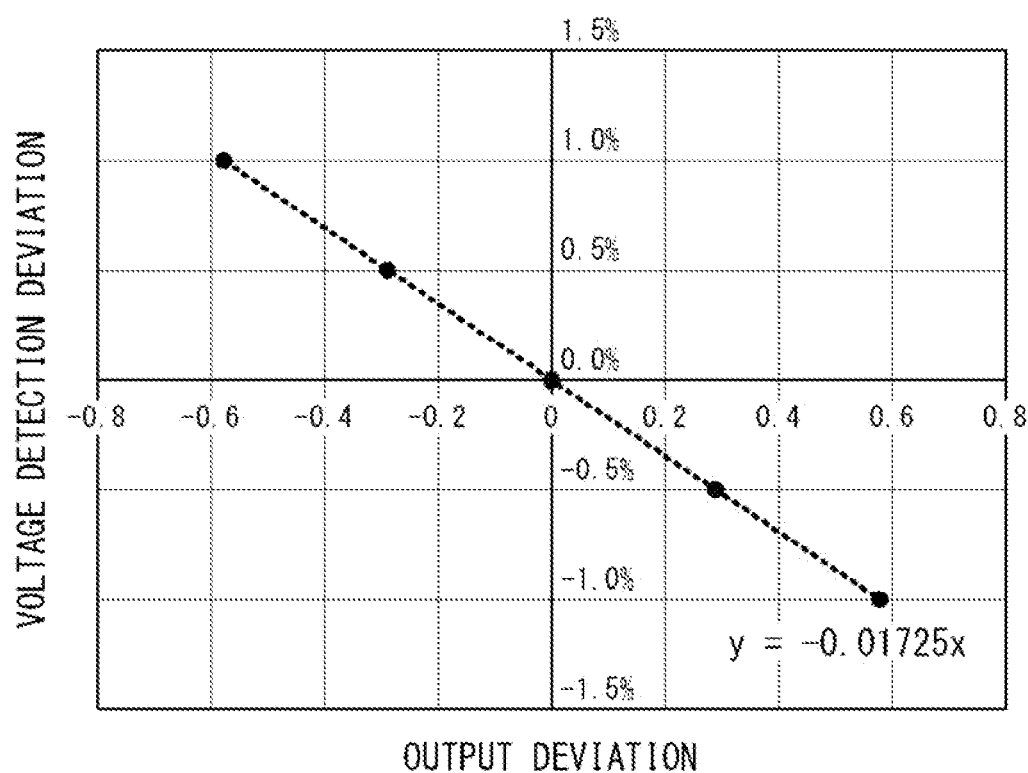
FIG. 16 shows a graph representing the relationship between an output deviation and a DC bus voltage detection deviation.

FIG. 16 shows a graph representing the relationship between the output deviation $\delta_i$ and the DC bus voltage detection deviation on the basis of the above results. The line representing the relationship is a proportional line passing the origin and having a negative slope. From this relationship, a correction coefficient $G_i$ for the DC bus voltage detection value for minimizing the output deviation $\delta_i$ can be obtained using the following Expression (6). Through calculation by software in the control unit of the DC/DC converter, the DC bus voltage detection value is divided back by $G_i$ to correct the deviation of the detection value, whereby the output deviation can be minimized.

$$G_i = 1 + h\delta_i, h = -0.01725 \qquad (6)$$

The slope h (=−0.01725) in FIG. 16 is approximately ⅔ as compared to −0.0260 in the case of the two parallel DC/DC converters shown in FIG. 12. That is, the slope varies depending on the number of the parallel DC/DC converters. When Expression (5) defining $\delta_i$ is applied to Expression (6), the following Expression (7) is obtained. Expression (7) indicates that a product of h and the number n of the parallel DC/DC converters is constant.

$$G_i = 1 - h\frac{P_i - \frac{1}{n}\sum_{k=1}^{n} P_k}{\frac{1}{n}\sum_{k=1}^{n} P_k} = 1 - nh\frac{nP_i - \sum_{k=1}^{n} P_k}{\sum_{k=1}^{n} P_k} \qquad (7)$$

Therefore, where H=nh is defined again, Expression (6) can be generalized into an expression including the number n of the parallel DC/DC converters, as shown by the following Expression (8).

$$G_i = 1 + (H/n) \cdot \delta_i, H = -0.05175 \qquad (8)$$

<<Correction Based on Output Deviation>>

Error ratios in DC bus voltage detection of the three DC/DC converters were set at +0.8%, +0.3%, −0.9%, respectively, and a resistance load of 10Ω was connected between the AC-side lines. In this case, a result before correction for the DC bus voltage detection values was that the outputs of the three DC/DC converters were 1350 W on average, and the deviations were $\delta_1$: −0.4249, $\delta_2$: −0.1352, $\delta_3$: +0.5601, and thus vary from each other. Then, when these output deviations are applied to Expression (8), the correction coefficients for the DC bus voltage detection values are $G_1$: 1.00733, $G_2$: 1.00233, $G_3$: 0.990. Using these correction coefficients, the DC bus voltage detection values were corrected.

Figure 17:
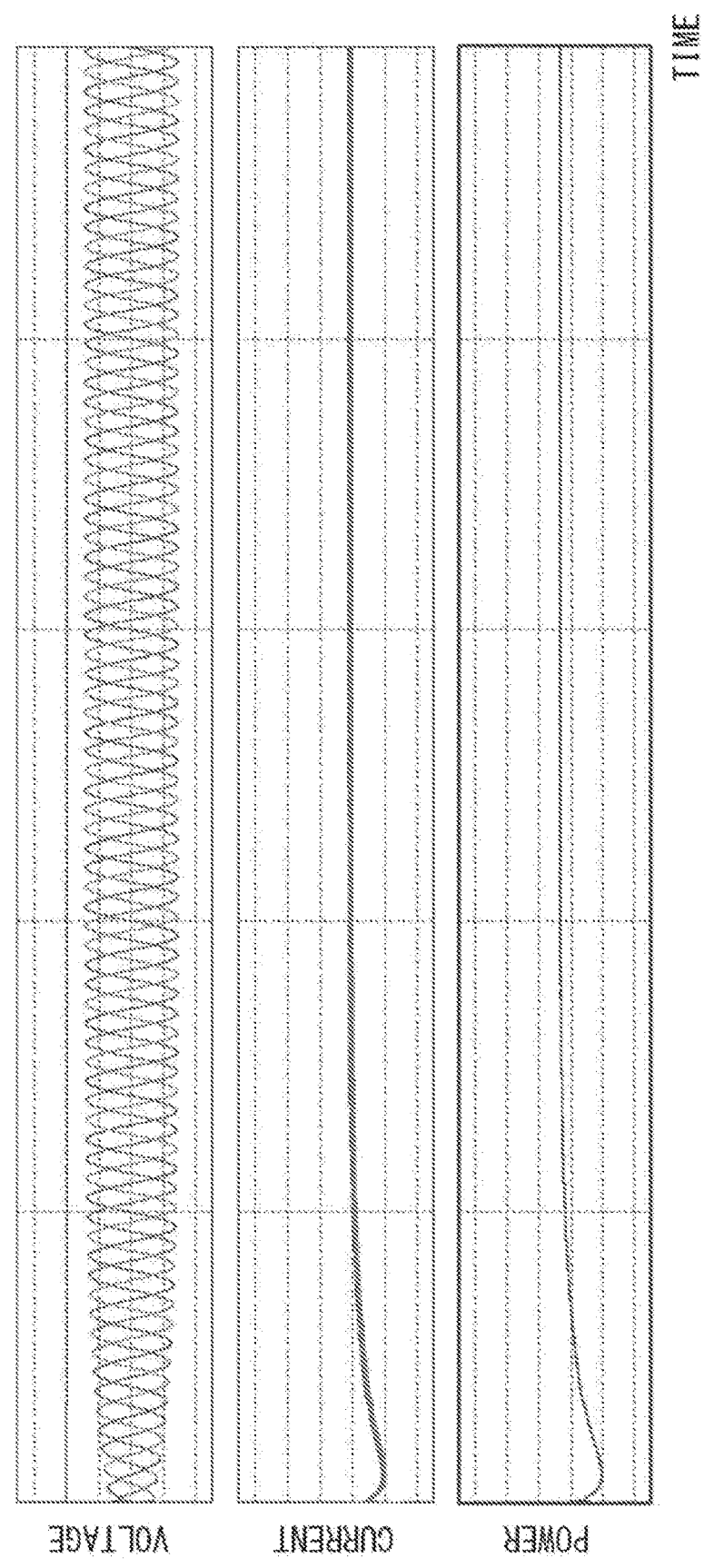
FIG. 17 shows graphs representing the state of the energy storage system operated with three DC/DC converters connected in parallel in a case of performing correction in addition to droop control.

FIG. 17 shows graphs representing the state of the energy storage system operated with three DC/DC converters connected in parallel in a case of performing the above correction in addition to the droop control. The horizontal axis indicates time. In the drawing, the graph at the upper stage shows the three-phase AC output voltages of the DC/AC converter and the DC bus voltage which is higher than the peak values of the AC output voltages. The graph at the middle stage shows three storage battery currents corresponding to the three DC/DC converters. The graph at the lower stage shows the output powers of the three DC/DC converters.

As a result, the outputs of the three DC/DC converters were almost equal to each other, and the output deviations were extremely reduced as $\delta_1$: 0.00673, $\delta_2$: 0.00653, $\delta_3$: −0.0132.

In addition, the AC-side load resistance was changed to 1.5Ω. Also in this case, the outputs of the three DC/DC converters were almost equal to each other, and the output deviations from an average value of 9213.6 W were further reduced as $\delta_1$: 0.000888, $\delta_2$: 0.000861, $\delta_3$: −0.00175.

Next, error ratios in DC bus voltage detection were changed to +1.2%, −0.5%, −1.2%, and a resistance load of 10Ω was connected between the AC-side lines. As a result, the outputs of the three DC/DC converters were 1344 W on average, and the deviations were $\delta_1$: −0.7972, $\delta_2$: +0.1944, $\delta_3$: +0.6027. When these output deviations are applied to Expression (8), the correction coefficients for the DC bus voltage detection values are $G_1$: 1.01375, $G_2$: 0.9966, $G_3$: 0.9896. Using these correction coefficients, the DC bus voltage detection values were corrected.

As a result, the outputs of the three DC/DC converters were almost equal to each other, and the output deviations were reduced as $\delta_1$: 0.00445, $\delta_2$: −0.00254, $\delta_3$: −0.00191.

Further, the AC-side load resistance was changed to 1.5Ω. Also in this case, the outputs of the three DC/DC converters were almost equal to each other, and the output deviations from an average value of 9213.8 W were further reduced as $\delta_1$: 0.000586, $\delta_2$: −0.000337, $\delta_3$: −0.000249.

Next, the number of the parallel DC/DC converters were increased to five. Error ratios in DC bus voltage detection were set at +1.2%, −0.5%, −1.2%, +0.8%, −0.8%, respectively, and a resistance load of 10Ω was connected between the AC-side lines. As a result, the outputs of the DC/DC converters were 803.6 W on average, and the deviations were $\delta_1$: −1.276, $\delta_2$: 0.3926, $\delta_3$: 1.07979, $\delta_4$: −0.88349, $\delta_5$: 0.68712. When these output deviations are applied to Expression (8), the correction coefficients for the DC bus voltage detection values are $G_1$: 1.0132, $G_2$: 0.9959, $G_3$: 0.9888, $G_4$: 1.00914, $G_5$: 0.99289. Using these correction coefficients, the DC bus voltage detection values were corrected.

As a result, the outputs of the five DC/DC converters were almost equal to each other with an average value of 810.61 W, and the output deviations were $\delta_1$: 0.0194, $\delta_2$: −0.00787, $\delta_3$: −0.0171, $\delta_4$: 0.0141, $\delta_5$: −0.00859.

Further, the AC-side load resistances were changed to 0.9Ω. Also in this case, the outputs of the five DC/DC converters were almost equal to each other, and the output deviations from an average value of 9325.3 W were further reduced as $\delta_1$: 0.00150, $\delta_2$: −0.000612, $\delta_3$: −0.00132, $\delta_4$: 0.00109, $\delta_5$: −0.000663.

In addition, with five parallel DC/DC converters, a case where error ratios in DC bus voltage detection were biased to the positive side was also confirmed. As an example, the error ratios were set at +2.0%, +1.5%, +1.0%, +0.5%, 0%. Also this case gave a result that the outputs of the DC/DC converters were successfully uniformed.

Further, a case where voltages of the DC power supplies connected to the respective DC/DC converters were different from each other was also confirmed. Specifically, the voltages of the DC power supplies were set at 200 V, 225 V, 250 V, 275 V, 300 V. As a result, only the output of one DC/DC converter became small because of constraints by an output current upper limit of 45 A, and the outputs of the other four DC/DC converters were uniform. From this result, it is found that the voltages of the DC power supplies do not influence output allocation among the DC/DC converters, and if any of the DC/DC converters is subjected to constraints by a current upper limit, the deficiency amount for load consumption power is equally allocated among the other DC/DC converters automatically.

That is, even in a case where the output of a specific storage battery is limited in accordance with the remaining amount or the degree of progress of deterioration, the above energy storage system performs operation as expected. The DC/DC converter corresponding to the storage battery that has reached a discharge limit or a full-charge state can be excluded from the targets for which the outputs are to be uniformed. If the output current upper limit is raised to 50 A, the one DC/DC converter is released from the output constraints, so that the outputs of the five DC/DC converters are uniformed.

<<Correction for Proportionality Coefficient H>>

Thus far, regarding correction for the DC bus voltage detection value based on the output deviation, the verification result has been shown on the premise that the proportionality coefficient H for the output deviation included in Expression (8) for calculating the correction coefficient is accurately obtained. However, in practice, this premise does not necessarily hold true. This is because, even if the coefficient H is estimated through a simulation or the like in which various conditions of an actual device are modeled as exactly as possible, it is impossible to make the simulation perfectly identical to the actual device, and thus some error is inevitably included as compared to the coefficient H of the actual device. Accordingly, while error is included in H, a case of correcting the error to uniform the outputs will be considered.

As long as an experiment is conducted using only a simulation, error of H cannot occur. Accordingly, H* obtained in advance for reproducing this error is assumed to be −0.025875 which is half the actual value, in the following consideration. In this case, for example, the correction coefficients are $G_1^*$:1.00502530059405, $G_2^*$: 1.0025130560483, $G_3^*$:0.999999866085955, $G_4^*$: 0.99748727259746, $G_5^*$:0.994974504674805. Correction for DC bus voltage detection using these correction coefficients is defined as primary correction, and a result after the primary correction will be shown below. The relationship between the output deviation before the correction and the output deviation after the primary correction will be calculated.

Figure 18:
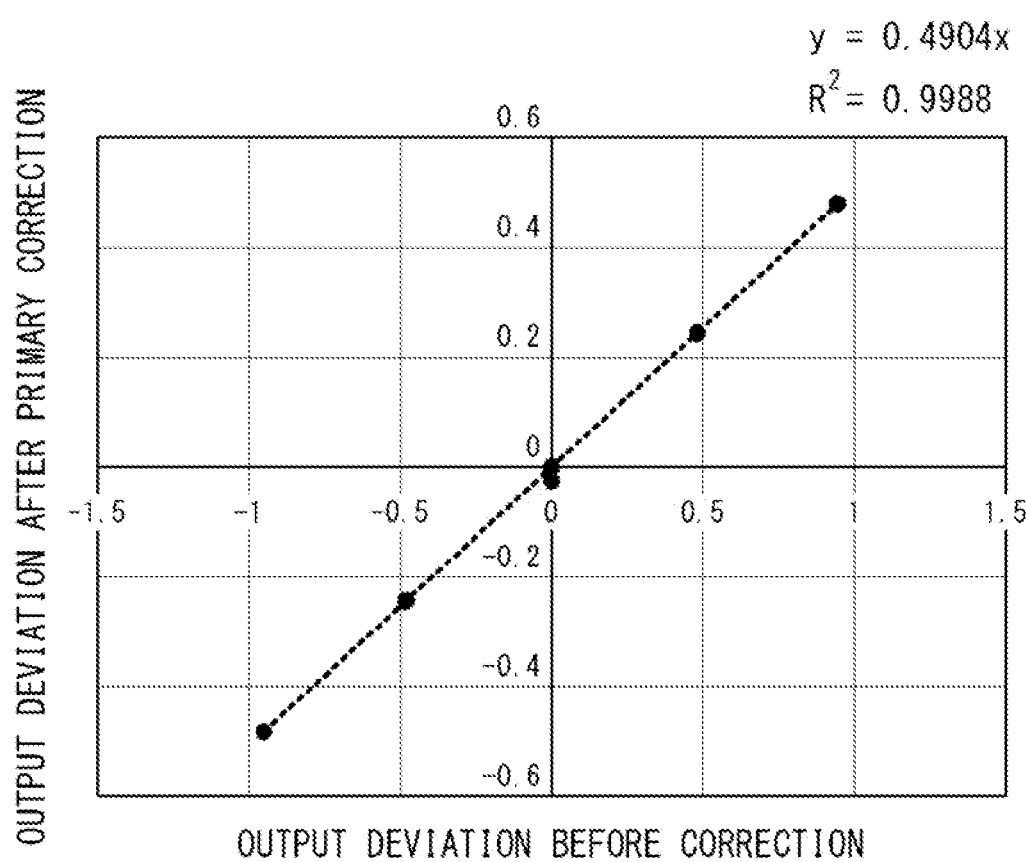
FIG. 18 shows a graph representing the relationship between the output deviation before correction and the output deviation after primary correction.

FIG. 18 shows a graph representing the relationship between the output deviation before the correction and the output deviation after the primary correction. Both values are in a proportional relationship, and the output deviation after the primary correction has been reduced to a value that is 0.4904 times the output deviation before the correction. Since the corrected output deviation has been generated on the basis of error of H* used for the primary correction, H* can be corrected on the basis of change in the deviation between before and after the correction. The relationship between the output deviation $\delta_i$ and a DC bus voltage detection deviation $\Delta_i$ can be represented by Expression (9). Here, $v_i$ is the DC bus voltage detection value, and $v_o$ is a DC bus voltage including no deviation.

$$\Delta_i = \frac{v_i - v_o}{v_o} = \frac{H}{n}\delta_i \quad (9)$$

The relationship between a DC bus voltage detection deviation $\Delta_i^*$ and an output deviation $\delta_i^*$ when $v_i$ is corrected using H* is represented by Expression (10).

$$\Delta_i^* = \frac{\frac{v_i}{1 + \frac{H^*}{n}\delta_i} - v_o}{v_o} = \frac{H}{n}\delta_i^* \quad (10)$$

From the above Expression (9) and Expression (10), the following Expression (11) and Expression (12) are obtained.

$$\frac{\Delta_i^*}{\Delta_i} = \frac{\frac{v_i}{1 + \frac{H^*}{n}\delta_i} - v_o}{v_i - v_o} = \frac{\delta_i^*}{\delta_i} \quad (11)$$

$$1 - \frac{H^*}{H} = \frac{\delta_i^*}{\delta_i}\left(1 + \frac{H^*}{n}\delta_i\right) \quad (12)$$

By deforming Expression (12) and using Expression (8) of the correction coefficient Gi, the following Expressions (13) and (14) are obtained.

$$\frac{H^*}{H} = 1 - \frac{\delta_i^*}{\delta_i}\left(1 + \frac{H^*}{n}\delta_i\right) = 1 - \frac{\delta_i^*}{\delta_i}G_i^* \quad (13)$$

$$G_i = 1 + \frac{H}{n}\delta_i = 1 + \frac{H^*}{n\left(1 - \frac{\delta_i^*}{\delta_i}G_i^*\right)}\delta_i \quad (14)$$

The correction coefficient $G_i$ is calculated using Expression (14) on the basis of the results before and after the primary correction. As $(\delta_i^*)/\delta_i$ in Expression (14), the slope 0.4904 in FIG. 18 was used. In this case, the correction coefficients are $G_1$: 1.009909185, $G_2$: 1.004943384, $G_3$: 0.999999737, $G_4$: 0.99508111, $G_5$: 0.990185816. Thus, these correction coefficients are almost equal to the correction coefficients calculated using the original H. Correction for the DC bus voltage detection values using these correction coefficients is defined as secondary correction.

For the five DC/DC converters, the output deviations after the secondary correction in a case where the load was 10Ω were as follows.
$P_1$: 808.72111 W, $\delta_1$: −0.0015630963095791
$P_2$: 807.53344 W, $\delta_2$: −0.0030293787433416
$P_3$: 808.11476 W, $\delta_3$: −0.0023116883879441
$P_4$: 810.58379 W, $\delta_4$: 0.00073654497438117
$P_5$: 814.98289 W, $\delta_5$: 0.0061676184664834
Average: 809.987198 W In addition, the output deviations after the secondary correction in a case where the load was 0.9Ω were as follows.
$P_1$: 9322.7666 W, $\delta_1$: −0.0001225987849281
$P_2$: 9321.6954 W, $\delta_2$: −0.00023748621246296
$P_3$: 9322.2296 W, $\delta_3$: −0.00018019265029986
$P_4$: 9324.4640 W, $\delta_4$: 5.9449310196535E-005
$P_5$: 9328.3929 W, $\delta_5$: 0.00048082833749458
Average: 9323.9097 W As described above, even in a case where the coefficient H cannot be estimated accurately, the outputs can be uniformed by such a method of calculating correction coefficients at two stages.

<<Flowchart>>

Figure 19:
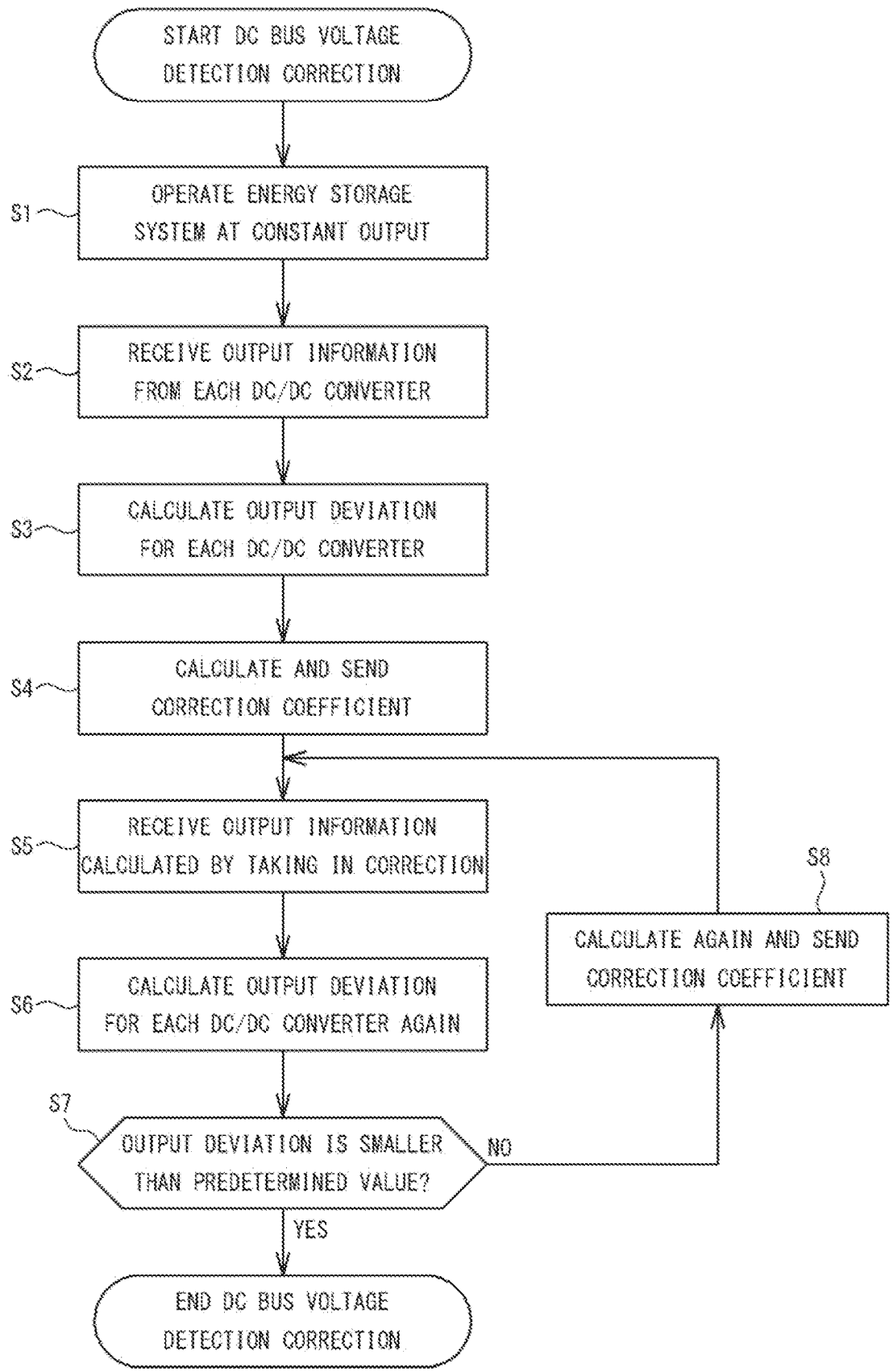
FIG. 19 is an example of a flowchart showing processing operation in DC bus voltage detection correction.

FIG. 19 is an example of a flowchart showing processing operation in DC bus voltage detection correction. A main unit that executes this flowchart is the management control unit 18. When the DC bus voltage detection correction is started, the management control unit 18 operates the energy storage system at a constant output (step S1). The control unit 17 of each DC/DC converter 16 detects the own output (output power) and sends the detected value to the management control unit 18. The management control unit 18 receives the output information sent from the control unit 17 (step S2). The management control unit 18 calculates an output deviation for each DC/DC converter 16 on the basis of the output information (step S3).

Next, the management control unit 18 calculates correction coefficients by Expression (8), and sends the correction coefficients to the respective DC/DC converters 16 (step S4). On each DC/DC converter 16 side, the output thereof is calculated by taking in the sent correction coefficient, and is sent to the management control unit 18. The management control unit 18 that has received the output information from each DC/DC converter 16 (step S5) calculates an output deviation for each DC/DC converter 16 again (step S6).

Then, the management control unit 18 determines whether or not the output deviation is smaller than a predetermined value (step S7), and if the output deviation is smaller than the predetermined value, the DC bus voltage detection correction is ended. If the output deviation is not smaller than the predetermined value, the management control unit 18 calculates a correction coefficient by Expression (14) again (step S8). Subsequently, the management control unit 18 executes steps S5, S6, S7 again, and in step S7, if the output deviation has become smaller than the predetermined value, the DC bus voltage detection correction is ended. Normally, it is considered that the output deviation has become smaller than the predetermined value at this stage. However, if the output deviation has not become smaller than the predetermined value, a correction coefficient may be further calculated again and the same processing may be repeated.

As described above, the management control unit 18 determines voltage detection deviations corresponding to individual output deviations compared to the entirety of the plurality of DC/DC converters, and gives correction values (correction coefficients) for reducing the voltage detection deviations to the respective control units for the plurality of DC/DC converters. The control units can uniform the outputs of the plurality of DC/DC converters, using the sent correction values. Communication is used for this sending, but fast communication is not needed.

The management control unit 18 changes the correction values in accordance with the number of the parallel DC/DC converters. That is, on the basis of a finding that appropriate correction values vary depending on the number of the parallel DC/DC converters, the management control unit 18 gives appropriate correction values in accordance with the number of the parallel DC/DC converters to the respective control units.

Here, the correction value (correction coefficient) in step S4 is defined as a first correction value. After each control unit has used the first correction value, the management control unit 18 newly determines voltage detection deviations corresponding to individual output deviations compared to the entirety of the plurality of DC/DC converters, and gives second correction values (correction coefficients) for reducing the voltage detection deviations to the respective control units for the plurality of DC/DC converters (step S8). In this way, even though the first correction values are provisional values, outputs of the plurality of DC/DC converters can be uniformed by the second correction values.

<<Summary of Disclosure>>

As described above in detail, the DC/DC conversion system 100 provided between the plurality of storage batteries 14 and the common DC bus $L_{DC}$ includes, for each of the plurality of storage batteries 14, the DC/DC converter 16 provided between the storage battery 14 and the DC bus $L_{DC}$, and the control unit 17 for controlling the DC/DC converter 16. Then, the control unit 17 corrects the DC bus voltage detection value by taking in an individual voltage detection deviation for the DC bus $L_{DC}$ compared to the entirety of the plurality of DC/DC converters 16 present in parallel, and controls the corresponding DC/DC converter 16 in accordance with a voltage command value having droop characteristics with respect to the output power.

The gist of the energy storage system 1 and the control method for DC/DC converters is also the same as described above.

In the DC/DC conversion system 100 as described above, such control that the plurality of DC/DC converters 16 provided in parallel operate so as to be equal in their outputs is realized using the droop characteristics of the voltage command values with respect to the output powers. In addition, in order to inhibit the outputs of the plurality of DC/DC converters from becoming unequal due to error in voltage detection for the DC bus $L_{DC}$, the DC bus voltage detection values are corrected by taking in voltage detection deviations of the DC bus $L_{DC}$. Thus, it becomes possible to uniform the outputs among the plurality of DC/DC converters 16 without depending on fast communication.

In order to send individual voltage detection deviations compared to the entirety to the respective DC/DC converters, a function such as the management control unit for observing the entirety is needed. However, communication for this sending need not be performed in real time, and may be low-speed communication that merely allows regular update. By performing regular update, it is possible to provide appropriate correction values (correction coefficients) even if the voltage detection deviations change over time.

The above control to uniform the outputs means that, in other words, the plurality of DC/DC converters connected in parallel to the DC bus each perform DC bus voltage distributed control independently so as to make the DC bus voltage constant. Since the DC bus voltage is always controlled so as to be kept within a certain range by the DC/DC converters, the DC/AC converter need not control the DC bus voltage to be constant and has only to control the output power exclusively, not only in stand-alone operation but also in grid interconnection operation.

<<Comparison with Central Control>>

In operation in grid interconnection, response of conventional "central control" for transmitting output command values using fast communication and response of DC bus voltage distributed control were compared with each other through a simulation.

First, a case of stand-alone operation is described. In central control, if communication delay in transmitting power command values from a central control unit to respective DC/DC converters became about 10 milliseconds, the DC bus voltage was reduced when the load sharply changed, so that the output voltage of the DC/AC converter could not keep a sinewave. In contrast, in the DC bus voltage distributed control, transmission of command values through communication is not performed and the control unit of each DC/DC converter controls the DC bus voltage independently. Therefore, the response speed was fast, and even when the load sharply changed, the DC bus voltage was kept within an appropriate range and the output voltage of the DC/AC converter was not disturbed.

Next, a case of grid interconnection operation is described. In central control, due to influences of communication delay and follow-up delay of DC bus voltage control by the DC/AC converter, when the communication delay was 10 milliseconds, the response time after the power command value was changed was about 30 milliseconds. In contrast, in the DC bus voltage distributed control, since the output current command value for the DC/AC converter is immediately updated when the power command value is updated, the response time was 3 milliseconds, i.e., $\frac{1}{10}$ of the response time in the central control. Thus, also in grid interconnection operation, the DC bus voltage distributed control is more advantageous for applications that require immediate response, such as a case of following a load, smoothing power generation of renewable energy, or performing frequency control.

<<Supplementary Note>>

It should be noted that the embodiment disclosed herein is merely illustrative and not restrictive in all aspects. The scope of the present invention is defined by the scope of the claims, and is intended to include meaning equivalent to the scope of the claims and all modifications within the scope.

REFERENCE SIGNS LIST

1 energy storage system
2 photovoltaic system 3 commercial power grid
4 transformer
5 CT
6 load
11 DC power supply system
11_1, 11_2, 11_n DC power supply device
12 DC/AC converter
13 control unit
14 storage battery
15 battery management system
16, 16_1, 16_2 DC/DC converter
17, 17_1, 17_2 control unit
18 management control unit
21 solar battery
21A array
22 DC/AC converter
100 DC/DC conversion system
121 smoothing capacitor
122 AC reactor
123 capacitor
124, 125, 126 voltage sensor
127, 128, 129 current sensor
161 smoothing capacitor
162 DC reactor
163 smoothing capacitor
165 voltage sensor
166 current sensor
167 voltage sensor
$L_{AC}$ AC electric path
$L_{DC}$ DC bus
$Q_H$, $Q_L$ switching element
Q1, Q2, Q3, Q4, Q5, Q6 switching element

The invention claimed is:

1. A DC/DC conversion system provided between a plurality of DC power supplies and a common DC bus, the DC/DC conversion system comprising, for each of the plurality of DC power supplies:
   a DC/DC converter provided between the DC power supply and the DC bus;
   a control unit configured to control the DC/DC converter; and
   a management control unit configured to determine voltage detection deviations for the DC bus corresponding to individual output deviations compared to an entirety of a plurality of DC/DC converters present in parallel, and give correction values for reducing the voltage detection deviations to the respective control units for the plurality of DC/DC converters, wherein
   the control unit corrects a voltage detection value for the DC bus based on the respective correction value, and controls the corresponding DC/DC converter in accordance with a voltage command value having droop characteristics with respect to output power.

2. The DC/DC conversion system according to claim 1, wherein
   the management control unit changes the correction values in accordance with a number of the parallel DC/DC converters.

3. The DC/DC conversion system according to claim 1, wherein
   where the correction values are defined as first correction values, after each control unit has used the first correction value, the management control unit newly determines voltage detection deviations corresponding to individual output deviations compared to the entirety of the plurality of DC/DC converters, and gives second correction values for reducing the voltage detection deviations to the respective control units for the plurality of DC/DC converters.

4. The DC/DC conversion system according to claim 1, wherein
   the management control unit regularly updates the correction values, and gives the updated correction values to the respective control units for the plurality of DC/DC converters.

5. The DC/DC conversion system according to claim 1, wherein
   the DC power supply is a storage battery, and the control unit limits a current flowing through the DC power supply on the basis of a state of charge of the DC power supply.

6. An energy storage system including a plurality of DC power supplies and a common DC bus, the energy storage system comprising, for each of the plurality of DC power supplies:
   a DC/DC converter provided between the DC power supply and the DC bus;
   a control unit configured to control the DC/DC converter; and
   a management control unit configured to determine voltage detection deviations for the DC bus corresponding to individual output deviations compared to an entirety of a plurality of DC/DC converters present in parallel, and give correction values for reducing the voltage detection deviations to the respective control units for the plurality of DC/DC converters, wherein
   the control unit corrects a voltage detection value for the DC bus based on the respective correction value, and controls the corresponding DC/DC converter in accordance with a voltage command value having droop characteristics with respect to output power.

7. The energy storage system according to claim 6, further comprising a DC/AC converter provided between the DC bus and an AC electric path, wherein
   the DC/AC converter changes an output thereof in accordance with a condition of a commercial power grid or a load connected to the AC electric path.

8. The energy storage system according to claim 6, wherein
   the DC/DC converter performs current control for the corresponding DC power supply.

9. A method for controlling a plurality of DC/DC converters provided in parallel to each other between a plurality of DC power supplies and a common DC bus, the method comprising:
   determining voltage detection deviations for the DC bus corresponding to individual output deviations compared to an entirety of a plurality of DC/DC converters present in parallel, and determining a correction value for reducing the voltage detection deviations;
   correcting a voltage detection value for the DC bus based on the determined correction value; and
   controlling the corresponding DC/DC converter in accordance with a voltage command value having droop characteristics with respect to output power.

* * * * *